United States Patent
Ko

(10) Patent No.: US 10,210,490 B2
(45) Date of Patent: Feb. 19, 2019

(54) PROCESSING ELECTRONIC MONETARY TRANSACTIONS USING PLURALITY OF VIRTUAL CURRENCY INSTRUMENTS

(71) Applicant: SONY CORPORATION, Tokyo (JP)

(72) Inventor: Thomas Ko, Monroe Township, NJ (US)

(73) Assignee: SONY CORPORATION, Tokyo (JP)

( * ) Notice: Subject to any disclaimer, the term of this patent is extended or adjusted under 35 U.S.C. 154(b) by 173 days.

(21) Appl. No.: 14/621,599

(22) Filed: Feb. 13, 2015

(65) Prior Publication Data
US 2016/0239813 A1 Aug. 18, 2016

(51) Int. Cl.
*G06Q 20/06* (2012.01)
*G06Q 30/02* (2012.01)
(Continued)

(52) U.S. Cl.
CPC ......... *G06Q 20/0655* (2013.01); *G06Q 20/10* (2013.01); *G06Q 20/204* (2013.01);
(Continued)

(58) Field of Classification Search
CPC ........ G06Q 40/00; G06Q 30/00–30/08; G06Q 20/00–20/10; G06Q 50/00; G06Q 20/22;
(Continued)

(56) References Cited

U.S. PATENT DOCUMENTS 7,536,350 B1 * 5/2009 Bent ................... G06Q 20/10
                                                      705/35
7,792,717 B1 * 9/2010 Hankins .............. G06Q 20/102
                                                      705/35
(Continued)

FOREIGN PATENT DOCUMENTS

WO   2008/103880 A   8/2008
WO   2015/009427 A   1/2015

OTHER PUBLICATIONS

International Search Report received for PCT Application No. PCT/JP2016/000143, dated Apr. 26, 2016. 4 pages.

*Primary Examiner* — Olusegun Goyea
(74) *Attorney, Agent, or Firm* — Chip Law Group

(57) ABSTRACT

Various aspects of a method and system for processing a monetary transaction are disclosed herein. The method includes registration, at a server, of a first virtual currency instrument that corresponds to a first account and one or more other virtual currency instruments that corresponds to one or more other accounts. The registered first virtual currency instrument is associated with a first value. The method further includes reception, at the server, of a redemption request of the registered first virtual currency instrument to process the monetary transaction. The received redemption request is higher than the first value associated with the registered first virtual currency instrument by an excess value. The method further includes redemption, at the server, the first value associated with the registered first virtual currency instrument and at least portions of one or more other values associated with the registered one or more other virtual currency instruments that correspond to the excess value, to process the monetary transaction.

19 Claims, 13 Drawing Sheets

(51) Int. Cl.
*G06Q 20/10* (2012.01)
*G06Q 20/20* (2012.01)
*G06Q 20/40* (2012.01)

(52) U.S. Cl.
CPC ..... *G06Q 20/4014* (2013.01); *G06Q 30/0215* (2013.01); *G06Q 30/0226* (2013.01); *G06Q 30/0227* (2013.01)

(58) Field of Classification Search
CPC ...... G06Q 20/227; G06Q 20/12; G06Q 20/32; G06Q 30/0601; G06Q 30/32; G06Q 20/34; G06Q 20/35; G06Q 20/36; G07F 17/32
USPC ............ 463/16–25; 705/14.1, 14.12, 14.33, 705/14.25, 14.36, 14.27, 14.38, 21, 38, 705/37, 39, 44, 26.1, 27.1, 34, 35, 16, 41; 235/380, 384
See application file for complete search history.

(56) References Cited

U.S. PATENT DOCUMENTS

| | | | | |
|---|---|---|---|---|
| 8,249,961 B1* | 8/2012 | Hopkins | ............ | G06Q 20/227 235/380 |
| 2003/0120571 A1* | 6/2003 | Blagg | ............ | G06Q 20/04 705/35 |
| 2006/0095371 A1* | 5/2006 | Jean-Baptiste | ...... | G06Q 20/102 705/40 |
| 2006/0184419 A1* | 8/2006 | Postrel | ............ | G06Q 20/06 705/14.12 |
| 2007/0267479 A1* | 11/2007 | Nix | ............ | G06Q 20/10 235/379 |
| 2008/0040261 A1* | 2/2008 | Nix | ............ | G06Q 20/04 705/39 |
| 2008/0243666 A1* | 10/2008 | Rowan | ............ | G06Q 30/08 705/37 |
| 2010/0082445 A1* | 4/2010 | Hodge | ............ | G06Q 20/10 705/21 |
| 2011/0010238 A1* | 1/2011 | Postrel | ............ | G06Q 30/02 705/14.38 |
| 2011/0180598 A1 | 7/2011 | Morgan et al. | | |
| 2011/0218884 A1* | 9/2011 | Kothari | ............ | G06Q 30/02 705/27.1 |
| 2011/0246342 A1* | 10/2011 | Gibson | ............ | G06Q 20/10 705/34 |
| 2011/0251882 A1* | 10/2011 | Richard | ............ | G06Q 30/02 705/14.25 |
| 2012/0226546 A1* | 9/2012 | Chuang | ............ | G06Q 30/0207 705/14.33 |
| 2012/0284109 A1* | 11/2012 | Postrel | ............ | G06Q 20/06 705/14.33 |
| 2013/0346179 A1* | 12/2013 | Postrel | ............ | G06Q 20/06 705/14.28 |
| 2014/0214626 A1* | 7/2014 | Bowers | ............ | G06Q 50/01 705/26.81 |
| 2014/0222542 A1* | 8/2014 | Postrel | ............ | G06Q 20/06 705/14.29 |
| 2014/0278894 A1* | 9/2014 | Toumayan | ......... | G06Q 30/0227 705/14.28 |
| 2014/0279474 A1* | 9/2014 | Evans | ............ | G06Q 20/3572 705/41 |
| 2014/0279487 A1* | 9/2014 | Poole | ............ | G06Q 20/22 705/42 |
| 2014/0279509 A1* | 9/2014 | Khilnani | ............ | G06Q 20/227 705/44 |
| 2015/0025956 A1* | 1/2015 | Beyer | ............ | G06Q 30/0238 705/14.38 |
| 2015/0088633 A1* | 3/2015 | Salmon | ............ | G06Q 30/0222 705/14.33 |
| 2015/0095131 A1* | 4/2015 | Postrel | ............ | G06Q 20/06 705/14.28 |
| 2015/0149271 A1* | 5/2015 | Battle | ............ | G06Q 30/0233 705/14.33 |
| 2015/0149272 A1* | 5/2015 | Salmon | ............ | G06Q 30/0233 705/14.33 |
| 2015/0269541 A1* | 9/2015 | MacGregor | ............ | G06Q 20/10 705/39 |
| 2015/0332264 A1* | 11/2015 | Bondesen | ............ | G06Q 20/405 705/44 |
| 2015/0371496 A1* | 12/2015 | Arnone | ............ | G07F 17/3232 463/17 |

* cited by examiner

PROCESSING ELECTRONIC MONETARY TRANSACTIONS USING PLURALITY OF VIRTUAL CURRENCY INSTRUMENTS

FIELD

Various embodiments of the disclosure relate to processing a monetary transaction. More specifically, various embodiments of the disclosure relate to processing a monetary transaction by use of one or more virtual currency instruments.

BACKGROUND

With the advent of electronic monetary transactions in the field of financial transaction processing, different financial and/or business institutions are inclined to provide lucrative financial offerings to their consumers today. Such advancements have contributed to the increasingly popular use of virtual currency instruments by consumers. The virtual currency instruments may facilitate the usage of virtual currency, which may be a digital representation of a value that may be digitally traded. The virtual currency may be unregulated digital money that may function as a medium of exchange, a unit of account and/or a store of value for a monetary transaction. Examples of virtual currencies instruments may include, but are not limited to, air miles, loyalty points, credit card points, physical coupons, app-based coins and tokens, mobile coupons and time and personal data exchanged for digital content. The widespread application and use of the virtual currencies instruments has created a thriving market at a magnitude far higher than initially projected.

Typically, in order to settle a financial transaction for a specific financial account, the consumer is required to use a virtual currency instrument, such as a gift card, which corresponds to a specific financial account. For example, the consumer is required to use an iTunes™ gift card to purchase items that correspond to a financial account, such as the iTunes™ music store. The consumer cannot redeem another gift card of another financial account, to purchase items of the financial account, such as the iTunes™ music store. Also, the balance amount in the virtual currency instrument should be greater than the value of a redemption request to purchase a specific item. Thus, it may be cumbersome for the consumer to always carry all the virtual currency instruments that correspond to all the financial accounts with sufficient balance amount before completion of an electronic monetary transaction.

In certain scenarios, different financial accounts may be managed by different merchant payment systems, via different payment networks. Thus, the consumer may be required to be aware of the terms of use of all virtual currency instruments and financial accounts before use of such virtual currency instruments in electronic monetary transactions. It may be desirable by the consumer to control all such monetary transactions for financial accounts from different financial institutions in a uniform and hassle-free manner, so that the consumers' purchase is not limited based on a type and balance amount of a specific virtual currency instrument.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system to process a monetary transaction provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
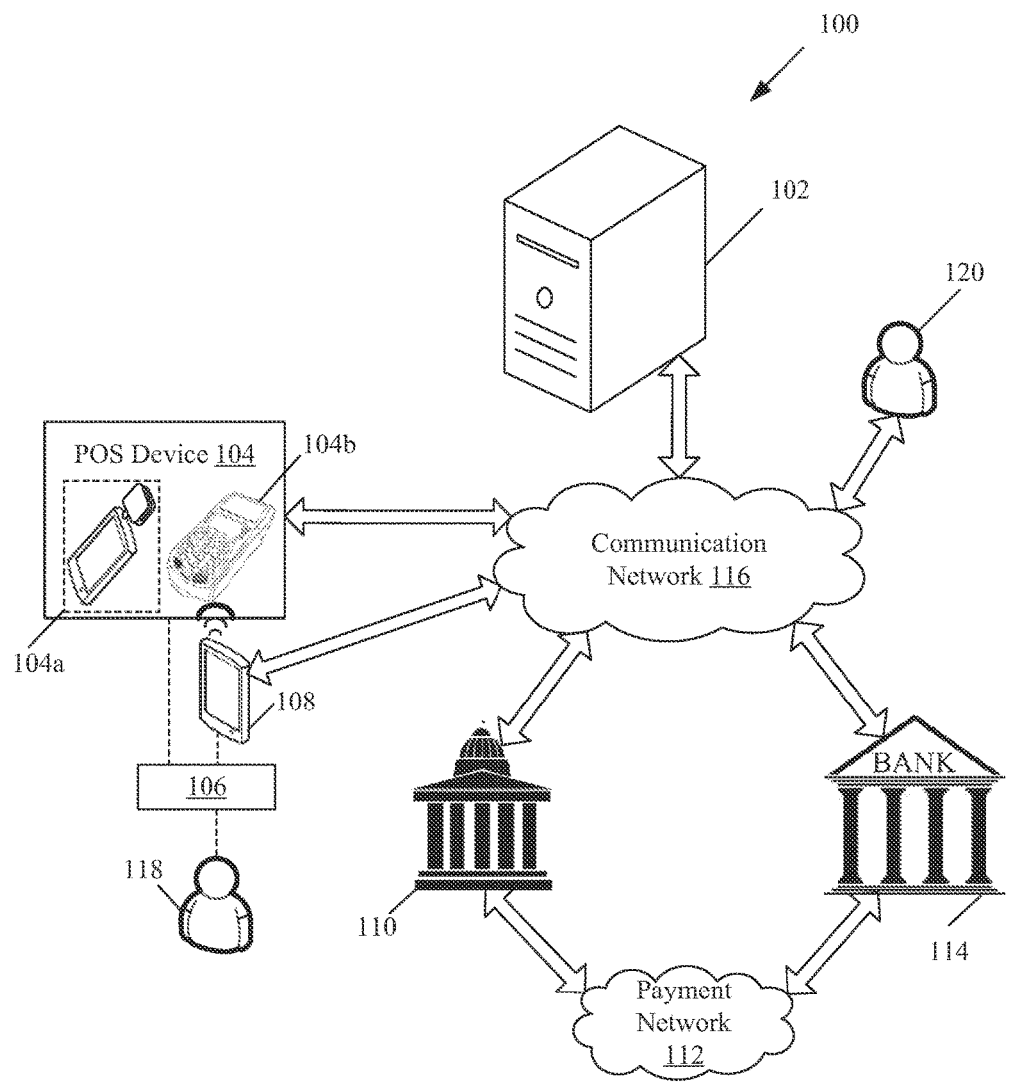
FIG. 1 is a block diagram that illustrates a network environment to process a monetary transaction, in accordance with an embodiment of the disclosure.

Various implementations may be found in a system and/or a method for processing a monetary transaction. The following embodiments are described in sufficient detail to enable those skilled in the art to make and use the disclosed embodiments. It is to be understood that other embodiments would be evident based on the present disclosure, and that system, process, or mechanical changes may be made without departing from the scope of the present disclosure.

In the following description, numerous specific details are given to provide a thorough understanding of the disclosure. However, it may be apparent that the disclosed embodiments may be practiced without these specific details. In order to avoid obscuring the present disclosure, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawings. Where multiple embodiments are disclosed and described having some features in common, for clarity and ease of illustration, description, and comprehension thereof, similar and like features one to another will ordinarily be described with similar reference numerals.

FIG. 1 is a block diagram that illustrates a network environment 100 to process a monetary transaction, in accordance with an embodiment of the disclosure. With reference to FIG. 1, there is shown a server 102, a POS device 104, and a plurality of virtual currency instruments 106. There is further shown an electronic device 108, an acquirer 110, a payment network 112, an issuer 114, a communication network 116, a first user 118, and a second user 120. The server 102 may be communicatively coupled to the POS device 104, the plurality of virtual currency instruments 106, the electronic device 108, the acquirer 110, the payment network 112, and the issuer 114, via the communication network 116. The acquirer 110 may be communicatively coupled to the issuer 114, via the payment network 112. The POS device 104 may facilitate usage of the plurality of virtual currency instruments 106 by the first user 118 directly or via the electronic device 108.

The server 102 may comprise suitable logic, circuitry, interfaces, and/or code that may be operable to receive one or more redemption requests initiated by the first user 118 associated with the POS device 104 or the electronic device 108. The server 102 may be further operable to intelligently process the received one or more redemption requests to process one or more monetary transactions. The server 102 may be implemented based on one or more technologies known in the art.

The POS device 104 may comprise suitable logic, circuitry, interfaces, and/or code that may be operable to facilitate usage of the plurality of virtual currency instruments 106. The POS device 104 may be a mobile POS device 104a or a standalone POS device 104b. The POS device 104 may be further operable to verify an identity of a user, such as the first user 118 and/or the second user 120, of the plurality of virtual currency instruments 106. The identity of the user may be based on confirmation of a signature of the user and/or a personal identification number (PIN) provided by the user at the POS device 104. The POS device 104 may further submit data captured from the plurality of virtual currency instruments 106 and the one or more redemption requests, to the acquirer 110. The POS device 104 may pay a monetary value, such as a merchant service commission (MSC), to the acquirer 110. Examples of the POS device 104 may include, but are not limited to, a laptop, a cash register, a tablet, a mobile device, a wireless pager, an electronic signature-capture device, and/or a magnetic card reader.

The plurality of virtual currency instruments 106 may comprise suitable logic, circuitries, interfaces, and/or codes that may be associated with a plurality of merchant accounts, such as a first account and one or more other accounts. Each of the plurality of virtual currency instruments 106 may be associated with a corresponding value and/or registration data. At least portions of the plurality of values associated with the plurality of virtual currency instruments 106 may be redeemed for the one or more redemption requests that may correspond to the one or more monetary transactions. Examples of the plurality of virtual currency instruments 106 may include, but are not limited to, gift cards, visa cards, cash-point cards, prepaid cards, mobile wallet apps, airline miles, coupons, retailer loyalty points, credit card points, bitcoins, and/or virtual points. The plurality of virtual currency instruments 106 may or may not have monetary value.

The electronic device 108 may comprise suitable logic, circuitry, interfaces, and/or code that may be configured to facilitate usage of the plurality of virtual currency instruments 106. In accordance with an embodiment, the electronic device 108 may include a pre-installed digital mobile wallet app, such as Google Wallet®, for mobile payments. In accordance with an embodiment, the electronic device 108 may include a pre-installed web interface to implement net-banking payments. The electronic device 108 may perform the one or more monetary transactions based on one or more of a messaging service, service-based transactional payment, a direct mobile billing, a mobile web payment (WAP), and/or a contactless near field communication (NFC). Examples of the electronic device 108 may include, but are not limited to, a smartphone, a personal digital assistant (PDA) device, a tablet, or other such portable electronic communication devices.

The acquirer 110 may comprise suitable logic, circuitry, interfaces, and/or code that may correspond to a corporation server or a financial institution server that facilitates the payment to a merchant account, such as the first account. The payment may be facilitated for the one or more monetary transactions, when the first virtual currency instrument is, for example, a bankard. In other words, the acquirer 110 may be configured to mediate between the POS device 104 and the merchant account. The POS device 104, associated with the first user 118, may be dedicated to the first account. The acquirer 110 may further communicate with one or more issuers, such as the issuer 114, as a merchant service provider. In accordance with an embodiment, the acquirer 110 may guarantee payment against all authorized bankcard-based monetary transactions. Examples of the acquirer 110 may include, but are not limited to, Visa®, MasterCard®, American Express®, and Discover®. The acquirer 110 may be implemented based on one or more server technologies, known in the art.

The payment network 112 may include a medium through which the acquirer 110 may communicate with the issuer 114. Various format standards may be defined for interchange of messages between the acquirer 110 and the issuer 114. Such format standards may comprise an American National Standards Institute (ANSI) X9.9 standard for financial message authentication, an ANSI X9.8 standard for personal identification number (PIN) management and security, and/or the like. Examples of the payment network 112 may include, but are not limited to, the Internet, a cloud network, a Long Term Evolution (LTE) network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the payment network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, and/or Bluetooth (BT) communication protocols.

The issuer 114 may comprise suitable logic, circuitry, interfaces, and/or code that may be operable to provide banking and/or financial facilities to a user, such as the first user 118. The issuer 114 may enter into contract with the first user 118 to provide the plurality of virtual currency instruments 106, such as a bankcard, for the one or more monetary transactions. The issuer 114 may extend credit to and/or manage the first user account of the first user 118. The issuer 114 may further prepare and deliver the first user account statements to the first user 118. The issuer 114 may pay the acquirer 110 for monetary transactions made to the merchant account on behalf of the first user 118. Examples of the issuer 114 may include, but are not limited to, Chase® and Citi®. The issuer 114 may be implemented based on one or more server technologies known in the art.

The communication network 116 may include a medium through which the server 102 may communicate with the POS device 104, the plurality of virtual currency instruments 106, the acquirer 110, and/or the issuer 114. Examples of the communication network 116 may include, but are not limited to, the Internet, a cloud network, a Long Term Evolution (LTE) network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 116, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, and/or Bluetooth (BT) communication protocols.

The first user 118 may be a first user account holder that may make one or more payments or withdraw cash by use of the plurality of virtual currency instruments 106. Similarly, the second user 120 may be a second user account holder that may make one or more payments or withdraw cash by use of another virtual currency instrument (not shown). In accordance with an embodiment, the second user 120 may make one or more payments or withdraw cash by use of one or more of the plurality of virtual currency instruments 106. In order to make such one or more payments, the first user 118 and the second user 120 may have to initiate one or more monetary transactions by use of the plurality of virtual currency instruments 106 and the other virtual currency instrument, respectively. The first user 118 and the second user 120 may possess and use the plurality of virtual currency instruments 106 and the other virtual currency instrument, respectively, in accordance with the terms and conditions of the contract with the issuer 114. In such a case, both the first user 118 and the second user 120 are associated with the same issuer, such as the issuer 114. In accordance with an embodiment, the first user 118 may be associated with the issuer 114 and the second user 120 may be associated with another issuer (not shown). The first user 118 may be associated with the second user 120, based on the first user account. The first user 118 may access the other virtual currency instrument, possessed by the second user 120, based on a set of access rights granted by the second user 120.

In operation, the first user 118 may initiate a request that may be transmitted to the server 102, via the communication network 116, for creation of a first user account. The request may comprise user data, such as a first user identifier, a first user passkey and personal data of the first user 118. In accordance with an embodiment, the first user 118 may initiate the request at the POS device 104 for creation of the first user account. In accordance with an embodiment, the POS device 104 may correspond to the smart POS device 104a. The smart POS device 104a may correspond to a combination of devices, such as a card reader device (for example, Square® card reader) communicatively connected to the electronic device 108 (for example, a smartphone). In such an instance, the electronic device 108 may comprise a proprietary software application, such as Square Register™, that may initiate and authorize one or more monetary transactions, for the one or more redemption requests, in conjunction with the card reader device. Notwithstanding, the disclosure may not be so limited and other software applications may be utilized to initiate and authorize one or more monetary transactions without limiting the scope of the disclosure.

In accordance with another embodiment, the POS device 104 may correspond to the standalone POS device 104b. The standalone POS device 104b may comprise a generic software application, such as a merchant payment system, to initiate and authorize one or more monetary transactions, for the one or more redemption requests. It may be understood by a person of ordinary skill in the art that for simplicity, hereinafter the term "POS device 104" may be used interchangeably with the terms "smart POS device 104a" and "standalone POS device 104b".

In accordance with an embodiment, the first user 118 may initiate the request at the smart POS device 104a. In accordance with an embodiment, the first user 118 may initiate the request at the electronic device 108. The initiated request may be transmitted to the standalone POS device 104b, via NFC connection or the communication network 116. In accordance with an embodiment, the first user 118 may initiate the request at the smart POS device 104a. The POS device 104 (such as the smart POS device 104a or the standalone POS device 104b) may further transmit the request to the server 102, via the communication network 116. In accordance with an embodiment, the first user 118 may initiate the request at the electronic device 108 and the electronic device 108 may directly transmit the request to the server 102, via the communication network 116.

Based on the received request, the server 102 may be operable to create the first user account for the first user 118. The first user identifier and the first user passkey may correspond to login credentials of the first user 118. The personal data may comprise personal details, such as name, address, email address, phone number, nationality, age, gender, marital status, family status, finger prints, blood type, educational history, financial history, employment history, and/or a contact list of the first user 118. Based on the contact list of the first user 118, the server 102 may determine an association of the first user 118 with the second user 120. The personal data may further comprise a set of user preferences. The set of user preferences may comprise a set of user preferences that may tag and/or categorize a service provided by a plurality of merchant accounts, such as the first account and one or more other accounts, associated with the server 102. In accordance with an embodiment, the first merchant account may be associated with the POS device 104.

In accordance with an embodiment, the server 102 may be further operable to receive access permissions from the first user 118. The access permissions may correspond to a set of permissions to share at least a portion of details of the created first user account. In accordance with an embodiment, the server 102 may allow the first user 118 to access a second virtual currency instrument associated with the second user 120 based on a set of access rights granted by the second user 120.

In accordance with an embodiment, the server 102 may be operable to receive registration data associated with the plurality of virtual currency instruments 106 from the first user 118. The received registration data may be stored in the created first user account that corresponds to the first user 118. The plurality of virtual currency instruments 106 may comprise a first virtual currency instrument that may correspond to a first account of a first merchant. The plurality of virtual currency instruments 106 may further comprise one or more other virtual currency instruments, in addition to the first virtual currency instrument, that may correspond to other accounts of other merchants.

The plurality of virtual currency instruments 106 may be registered with the first user 118 based on the registration data. In accordance with an embodiment, the registration data of the plurality of virtual currency instruments 106, transmitted to the server 102, may be automatically determined based on a barcode, a set of data pre-stored in a cloud, a scanned quick-response (QR) code, a scanned plastic card, or a scanned paper and/or an electronic message associated with the plurality of virtual currency instruments 106. In accordance with an embodiment, the registration data of the plurality of virtual currency instruments 106, transmitted to the server 102, may be manually entered by the first user 118 at the POS device 104 or the electronic device 108. In accordance with an embodiment, the registration data of the plurality of virtual currency instruments 106, transmitted to the server 102, may be automatically entered based on data captured by the POS device 104 or the electronic device 108. The data may be captured by the POS device 104 or the electronic device 108 when the plurality of virtual currency instruments 106 is utilized via the POS device 104 or the electronic device 108.

In accordance with an embodiment, the server 102 may be operable to transmit at least a portion of the first user account and/or the registration data to the POS device 104 or the electronic device 108, for verification of the first user account. In accordance with an embodiment, the transmitted portion of the first user account and/or the registration data may be customized based on type of the first account and/or the one or more other accounts. In instances when the first user account is successfully verified, the POS device 104 or the electronic device 108 may transmit a notification to the server 102. Based on the notification, the server 102 may be operable to receive a response from the first account. The response may comprise a plurality of balance values associated with the registered plurality of virtual currency instruments 106. In accordance with an embodiment, the registered plurality of virtual currency instruments 106 may comprise a registered first virtual currency instrument and registered one or more other virtual currency instruments, which may include the registered second virtual currency instrument. Based on the response, the server 102 may be operable to generate a redemption log to store the plurality of balance values associated with the registered plurality of virtual currency instruments 106. The server 102 may be further operable to transmit a notification for the first user 118. In accordance with an embodiment, the notification may be displayed at the POS device 104. In accordance with an embodiment, the notification may be displayed at the electronic device 108.

In accordance with an embodiment, the first user 118 may initiate a monetary transaction for a purchase of one or more items that may correspond to the first account of the first merchant. The first user 118 may initiate the monetary transaction by use of the registered first virtual currency instrument. In accordance with an embodiment, the registered first virtual currency instrument (such as a bankcard, a stored-value card, a fleet card, and/or a gift card) may be utilized for redemption when the monetary transaction is processed.

In accordance with an embodiment, the registered first virtual currency instrument may be redeemed at the smart POS device 104a. The smart POS device 104a may process the monetary transaction by use of a software application installed in the electronic device 108 that corresponds to a communicatively connected card reader device. In accordance with an embodiment, the registered first virtual currency instrument may be redeemed at the standalone POS device 104b. The standalone POS device 104b may process the monetary transaction by use of a software application, such as a merchant payment system, installed in the standalone POS device 104b. The standalone POS device 104b may correspond to a point-of-sale device provided by the acquirer 110 of the first merchant, in order to process the monetary transaction.

In accordance with an embodiment, the registered first virtual currency instrument may be utilized by the electronic device 108. The electronic device 108 may communicate with the standalone POS device 104b, via a short-distance communication network, such as NFC connection. In an exemplary scenario, a tapping gesture may be performed between the electronic device 108 and the standalone POS device 104b, to establish short-distance contactless NFC connection. Based on the tapping gesture, the redemption request may be generated.

The monetary transaction may be initiated and/or authorized based on the installed software application in the standalone POS device 104b or the smart POS device 104a. The standalone POS device 104b or the smart POS device 104a may read the registration data related to the registered first virtual currency instrument and the first user account from an embedded magnetic strip of the first virtual currency instrument.

In accordance with an embodiment, the registered first virtual currency instrument (such as a mobile/online wallet, an online net banking account, and an electronic currency) may be utilized by the electronic device 108 (such as a smartphone). The electronic device 108 may be operable to communicate with the server 102, via the communication network 116. The registration data related to the registered first virtual currency instrument and the first user account, may be received by the server 102 from the standalone POS device 104b, the smart POS device 104a, or the electronic device 108, via the communication network 116.

In accordance with an embodiment, the first user 118 may provide the value of the redemption request at the POS device 104 and/or the electronic device 108, by use of bank rails. In accordance with an embodiment, the POS device 104 may be operable to receive the redemption request of the registered first virtual currency instrument. The registered first virtual currency instrument may correspond to the first account of the first merchant. The POS device 104 may receive the value to be redeemed from the first user 118, directly or via the electronic device 108. The POS device 104 may verify the first user account and determine the registration data of the first virtual currency instrument, which is stored in a local memory at the time of registration. The POS device 104 may transfer the received redemption request to the acquirer 110. The acquirer 110, in conjunction with the POS device 104, and/or a third-party entity (not shown) may be operable to perform basic authorization checks of the registered first virtual currency instrument used for the monetary transaction. Examples of the basic authorization checks, known in the art, may include a "first-screening test", a "negative file" check, and/or a "velocity file" check. The acquirer 110 and/or the third-party entity may be further operable to negotiate different business arrangements with the issuer 114, via the payment network 112. Based on the successful basic authorization checks by the acquirer 110 and/or the third-party entity, the first value associated with the registered first virtual currency instrument may be ready to be redeemed.

In accordance with an embodiment, the first user 118 may provide the value of the redemption request at the POS device 104 directly, or at the electronic device 108 communicatively coupled to the POS device 104, without use of the bank rails. In such an embodiment, the POS device 104 may be a cash register. The POS device 104 may be operable to receive the redemption request that corresponds to the registered first virtual currency instrument. The POS device 104 may further receive the value to be redeemed from the first user 118, directly or via the electronic device 108. The POS device 104 may determine the verified first user account and the registration data of the first virtual currency instrument, stored in a local memory at the time of registration. The POS device 104 may further perform preliminary authorization checks of the registered first virtual currency instrument used for the monetary transaction. Based on the successful preliminary authorization checks by the POS device 104, it may be indicated to the server 102 that the first value in the first virtual currency instrument is ready to be redeemed.

In accordance with an embodiment, the value of the redemption request may be provided by the first user 118 associated with a first virtual currency instrument, such as a virtual prepaid card, by use of the bank rails. The first virtual currency instrument may be used at an e-commerce checkout point (not shown) to generate the redemption request of the first virtual currency instrument. The first virtual currency instrument may correspond to the first account of the first merchant. The e-commerce checkout point may receive the value from the first user 118 for the redemption. The e-commerce checkout point may verify the first user account and determine the registration data of the first virtual currency instrument, stored in the local memory at the time of registration. The e-commerce checkout point may transfer the received redemption request to the acquirer 110. The acquirer 110 and/or a third-party entity (not shown) may be operable to perform the basic authorization checks of the first virtual currency instrument used for the monetary transaction. The acquirer 110 and/or the third-party entity may be further operable to negotiate different business arrangements with the issuer 114, via the payment network 112. Based on the successful basic authorization checks by the acquirer 110 and/or the third-party entity, the first value associated with the registered first virtual currency instrument may be ready to be redeemed. The issuer 114 may transfer the received redemption request to the server 102 to indicate that the first value in the first virtual currency instrument is ready to be redeemed.

In accordance with an embodiment, the value of the redemption request may be provided by the first user 118 at the POS device 104 directly, or at the electronic device 108 communicatively coupled to the POS device 104, without the use of the bank rails. The first virtual currency instrument, that corresponds to the first account of the first merchant, may be used at the e-commerce checkout point (not shown) to generate the redemption request. The e-commerce checkout point may receive the value to be redeemed from the first user 118. The e-commerce checkout point may verify the first user account and determine the registration data of the first virtual currency instrument, stored in the local memory at the time of registration. The e-commerce checkout point may transfer the received redemption request to the server 102 to indicate that the first value in the first virtual currency instrument is ready to be redeemed.

In accordance with an embodiment, the value of the redemption request for a monetary transaction may be less than the first value associated with the registered first virtual currency instrument. Based on the successful basic authorization checks, the POS device 104 may redeem the first value associated with the registered first virtual currency instrument. Based on the redemption, the first balance value of the registered first virtual currency instrument may be updated with the difference of the first value and the value of the redemption request. The POS device 104 may transmit a notification to the first user 118. The notification may correspond to a successful completion of the monetary transaction.

The POS device 104 may be operable to transmit the updated first balance value of the registered first virtual currency instrument to the server 102. The server 102 may receive the updated first balance value of the registered first virtual currency instrument to update the redemption log. The redemption log may correspond to the redemption details of the first virtual currency instrument, transaction details of the first user account, and/or at least a portion of the registration data. The server 102 may further generate a request log. The request log may correspond to the received redemption request for the monetary transaction.

In accordance with an embodiment, the server 102 may be further operable to update the generated request log and/or the redemption log, based on data log received from POS device 104 and/or the electronic device 108. The data log may comprise a time stamp associated with the received redemption request and the processed monetary transaction, tokenized data that may correspond to the plurality of accounts, tokenized data that may correspond to the POS device 104 and/or the electronic device 108, and/or metadata associated with the processed monetary transaction. The data log may further comprise historic metadata related to one or more historic monetary transactions. In accordance with an embodiment, the server 102 may determine a discordance in the generated request log and/or the generated redemption log based on the received data log. In such an embodiment, the server 102 may execute a pre-specified process. The pre-specified process may be one or more of confirmation of a status of a processed monetary transaction, refund of the value and/or locking the first user account. Based on the updated request log and/or the redemption log, the server 102 may be operable to confirm the available first balance value associated with the registered first virtual currency instrument and/or the one or more other balance values of the registered one or more other virtual currency instruments. The available first balance value and/or the one or more other balance values may be confirmed to the first user 118 and/or the first account and one or more other accounts, respectively.

In accordance with an embodiment, the value of the redemption request may exceed the first value associated with the registered first virtual currency instrument. In accordance with an embodiment, the POS device 104 may further transmit the redemption request to the server 102. In such a case, the server 102 may determine an excess value, by which the value of the received redemption request is higher than the first value associated with the registered first virtual currency instrument.

In accordance with an embodiment, the POS device 104 may determine the excess value, by which the value of the received redemption request is higher than the first value associated with the registered first virtual currency instrument. In such a case, the POS device 104 may transmit the redemption request, along with a portion of the first user account and the registration data of the first virtual currency instrument, to the server 102. Based on the received request, the server 102 may check the registration data of the first virtual currency instrument and verify the first user 118. Subsequently, the server 102 may determine the registered one or more other virtual currency instruments associated with the first user 118. The registered one or more other virtual currency instruments may be determined, based on the first user account of the first user 118. The server 102 may further convert the excess value, based on an exchange rate between the one or more other values associated with the registered one or more other virtual currency instruments and the first value associated with the registered first virtual currency instrument. The server 102 may further determine the one or more other balance values that correspond to the registered one or more other virtual currency instruments.

In accordance with an embodiment, the determination of the registered one or more other virtual currency instruments may be based on a no-priority scheduling algorithm, such as a round-robin algorithm. Accordingly, the excess value may be split into equal parts for redemption. The excess value may be split into equal parts based on a count of the registered one or more other virtual currency instruments. In such an embodiment, at least portions of the one or more other values associated with the registered one or more other virtual currency instruments may be redeemed based on the splitting of the excess value into the equal parts. In accordance with an embodiment, the determination of the sequence of the registered one or more other virtual currency instruments may be based on a priority order of the registered one or more other virtual currency instruments. The priority order of the registered one or more of the other virtual currency instruments, defined by the first user 118, may be based on a set of user preferences provided by the first user 118, at the time of the registration of the one or more other virtual currency instruments. In accordance with an embodiment, the server 102 may be operable to determine the priority order of the registered first virtual currency instrument and the registered one or more other virtual currency instruments, collectively, based on one or more criteria. In accordance with an embodiment, the server 102 may be operable to determine the priority order of only the registered one or more other virtual currency instruments based on the one or more criteria. Instances of the one or more criteria may include, but are not limited to, an order of one or more other values associated with the registered one or more other virtual currency instruments, category of services associated with the registered one or more other virtual currency instruments, exchange rate between the one or more other values associated with the registered one or more other virtual currency instruments and the first value associated with the registered first virtual currency instrument, and machine learning of historic user preferences provided by the first user 118. Other instances of the one or more criteria may include, but are not limited to, registration data associated with the registered one or more other virtual currency instruments, an order of registration of the one or more other virtual currency instruments, an order of expiration date of the registered one or more other virtual currency instruments, the value of the redemption request, and/or historical redemption requests associated with the first account. The one or more criteria to determine the registered one or more other virtual currency instruments is described in detail in FIG. 2.

Based on the determined priority order, the server 102 may be operable to determine a first sequence of the registered one or more other virtual currency instruments. The server 102 may transmit the registered one or more other virtual currency instruments, in the determined first sequence, to the POS device 104 or the electronic device 108. In accordance with an embodiment, the POS device 104 may further transmit the registered one or more other virtual currency instruments as display data, in the determined first sequence, to the electronic device 108. In accordance with an embodiment, the first user 118 may provide a set of user preferences on the display data that includes the registered one or more other virtual currency instruments in the first sequence, via the POS device 104 or the electronic device 108. The set of user preferences may correspond to a selection of the registered one or more other virtual currency instruments from the POS device 104 or the electronic device 108 for redemption of the excess value. Based on the set of user preferences, a second sequence of the registered one or more other virtual currency instruments may be determined. The second sequence may include a revised priority order of the registered one or more other virtual currency instruments. In accordance with an embodiment, the second sequence may be same as that of the first sequence. In accordance with an embodiment, the second sequence may be different from the first sequence. In accordance with an embodiment, the second sequence may be a subset of the first sequence.

In accordance with an embodiment, the set of user preferences may further include preferred values for each of the registered one or more other virtual currency instruments for the redemption of the excess value. In accordance with an embodiment, the set of user preferences may further include instructions to split the excess value into user-preferred parts for each of the registered one or more other virtual currency instruments for the redemption of the excess value. In accordance with the exemplary scenario described above, the second sequence may comprise only the second virtual currency instrument such that at least a portion of the second value associated with the second virtual currency instrument is redeemed based on the determined excess value.

In accordance with an embodiment, the determined second sequence may be transmitted to the server 102 from the POS device 104 or the electronic device 108. The server 102 may be further operable to authenticate the second sequence of the registered one or more other virtual currency instruments for processing the monetary transaction. In accordance with another embodiment, the second sequence is not determined by the POS device 104 or the electronic device 108. In such an embodiment, the server 102 may be operable to authenticate the first sequence of the registered one or more other virtual currency instruments that correspond to one or more values for processing the monetary transaction. Based on the authentication, the server 102 may be further operable to process the monetary transaction based on redemption of the first value and at least portions of one or more other values associated with the registered one or more other virtual currency instruments, such as the second virtual currency instrument. The second balance value may correspond to the authenticated registered second virtual currency instrument. In accordance with an embodiment, the server 102 may be operable to modify the exchange rate in real time or periodically based on an analysis of the processed monetary transactions and/or historical monetary transactions retrieved from the first user account.

The server 102 may be further operable to update the request log and/or the redemption log based on the processing of the monetary transaction. The server 102 may be further operable to update the first balance value of the registered first virtual currency instrument and the one or more other balance values of the registered one or more other virtual currency instruments, when the monetary transaction is processed. The server 102 may be further operable to transmit the updated first balance value of the registered first virtual currency instrument, which corresponds to the first account, to the POS device 104. Such a transmission may reconcile the first balance value of the registered first virtual currency instrument at the POS device 104 of the first merchant (that corresponds to the first account) for next monetary transaction. The server 102 may transmit a notification of the successful completion of the monetary transaction to the POS device 104 or the electronic device 108. The notification may comprise an updated first balance value of the registered first virtual currency instrument and the one or more other balance values of the registered one or more other virtual currency instruments. In accordance with an embodiment, the notification may be displayed on the POS device 104 when the first virtual currency instrument is a tangible payment card. In accordance with an embodiment, the notification may be displayed on the POS device 104 or the electronic device 108 as a text-based message. In accordance with an embodiment, the notification may be played at the POS device 104 or the electronic device 108 as an audio-based or a video-based message.

Figure 2:
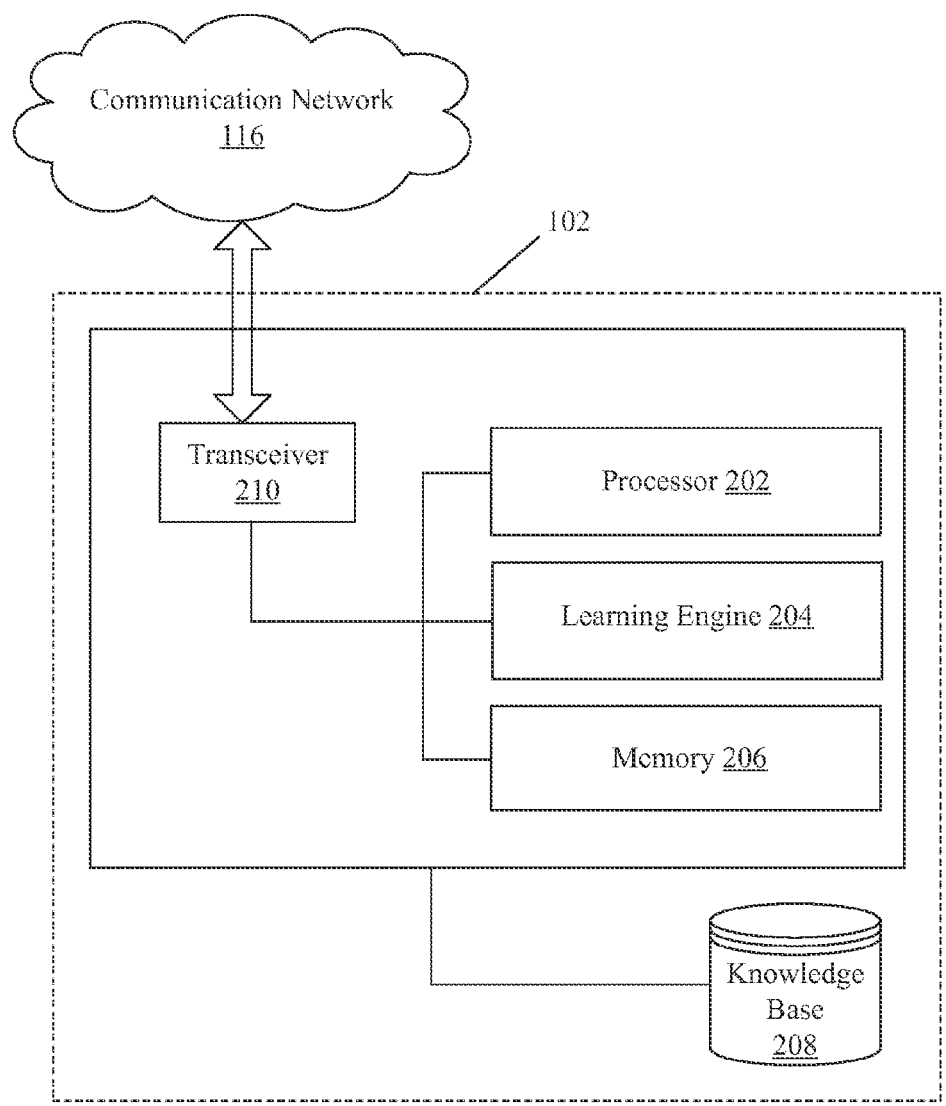
FIG. 2 is a block diagram that illustrates an exemplary server to process a monetary transaction, in accordance with an embodiment of the disclosure.

FIG. 2 is a block diagram that illustrates an exemplary server to process a monetary transaction, in accordance with an embodiment of the disclosure. FIG. 2 is explained in conjunction with elements from FIG. 1. With reference to FIG. 2, there is shown the server 102. The server 102 may comprise one or more circuits, such as a processor 202 and a learning engine 204. The server 102 may further comprise a memory 206, a database, such as a knowledge base 208, and a transceiver 210. The processor 202 may be communicatively coupled to the learning engine 204, the memory 206, the knowledge base 208, and the transceiver 210.

The processor 202 may comprise suitable logic, circuitry, interfaces, and/or code that may be operable to execute a set of instructions stored in the memory 206. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The learning engine 204 may comprise suitable logic, circuitry, and/or interfaces that may be operable to track the set of user preferences provided by the first user 118 at different instances of time. The different instances of time may correspond to the time of creation of the first user account, the time of registration of the plurality of virtual currency instruments 106, and/or the time of determination of a second sequence at the POS device 104 or the electronic device 108. The learning engine 204 may further track the redemption requests received by the server 102. The learning engine 204 may further track the user accounts, such as the first user account of the first user 118. The learning engine 204 may be further operable to deduce knowledge and learn data from the tracked set of user preferences, the redemption requests, and/or the user accounts. The learning engine 204 may be further operable to store the deduced knowledge and the learned data in the knowledge base 208. The learning engine 204 may be operable to determine one or more recommendations of the first virtual currency instrument and/or the registered one or more other virtual currency instruments, for the first user 118 and/or another user, such as the second user 120. The learning engine 204 may be implemented based on one or more approaches, such as an artificial neural network (ANN), an inductive logic programming approach, a support vector machine (SVM), an association rule learning approach, a decision tree learning approach, and/or a Bayesian network.

In an implementation, the learning engine 204 may be a part of the processor 202. In another implementation, both the learning engine 204 and the processor 202 may be implemented as a cluster of processors or an integrated processor. Such a cluster of processors or integrated processors may perform the functions of both the learning engine 204 and the processor 202. Examples of the learning engine 204 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 206 may comprise suitable logic, circuitry, and/or interfaces that may be operable to store a machine code and/or a computer program with at least one code section executable by the processor 202 and/or the learning engine 204. The memory 206 may be operable to store the user accounts, such as the first and the second user accounts. The first and the second user accounts may comprise registration data that corresponds to the first user 118 and the second user 120, respectively. The memory 206 may be further operable to store request logs and/or redemption logs (associated with a monetary transaction) that may correspond to the redemption request and the redemption details, respectively. The memory 206 may be further operable to store the set of user preferences provided by one or more users, such as the first user 118 and the second user 120. Examples of implementation of the memory 206 may include, but are not limited to, Random Access Memory (RAM), Read Only Memory (ROM), Hard Disk Drive (HDD), and/or a Secure Digital (SD) card.

The knowledge base 208 may comprise suitable logic, circuitry, and/or interfaces that may be operable to store the deduced knowledge and the learned data determined by the learning engine 204. Such deduced knowledge and the learned data may be based on the historical data related to the tracked set of user preferences, the redemption requests, and the user accounts (which may correspond to the first user 118 and/or the second user 120). Examples of implementation hardware of the knowledge base 208 may include, but are not limited to, flash drive, Hard Disk Drive (HDD), and/or a Secure Digital (SD) card.

The transceiver 210 may comprise suitable logic, circuitry, interfaces, and/or code that may be operable to communicate with the other servers, via the communication network 116. The transceiver 210 may implement known technologies to support wired or wireless communication of the server 102 with the communication network 116. The transceiver 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as a Global System for Mobile Communications (GSM), Enhanced Data GSM Environment (EDGE), wideband code division multiple access (W-CDMA), code division multiple access (CDMA), time division multiple access (TDMA), Long Term Evolution (LTE), Bluetooth, Wireless Fidelity (Wi-Fi) (e.120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be operable to receive a request from the first user 118 associated with the POS device 104 or the electronic device 108, via the communication network 116. The request may be received by the processor 202 from the POS device 104 or the electronic device 108, via the transceiver 210, to create a first user account. Based on the received request, the processor 202 may be operable to create a first user account for the first user 118. The processor 202 may be operable to create the first user account based on user data that may comprise one or more of a first user identifier, a first user passkey, and/or personal data of the first user 118. The first user identifier may be manually selected by the first user 118 or automatically determined by the POS device 104 or the electronic device 108 associated with the first user 118.

In accordance with an embodiment, the first user passkey may be manually selected by the first user 118 by use of a numeric and/or an alphanumeric string. In accordance with an embodiment, the first user passkey may be automatically determined by the processor 202 based on biometric information, such as fingerprint pattern, palm geometry, two-dimensional (2D) or three-dimensional (3D) facial profile, and/or characteristic features of the iris of the first user 118. In accordance with an embodiment, the personal data may comprise personal details of the first user 118. The personal data may further comprise a contact list that may correspond to details of other user accounts of selective family members, friends, and other persons known to the first user 118. Based on the contact list, the processor 202 may be operable to determine an association of the first user 118 with another user, such as the second user 120. For example, the server 102 may determine that the second user 120 is a family member or a friend of the first user 118. In accordance with an embodiment, the personal data may further comprise the set of user preferences that may tag and/or categorize a service provided by a first account or one or more other accounts associated with the server 102. The first account may correspond to a first merchant and the one or more other accounts may correspond to one or more other merchants.

In accordance with an embodiment, the processor 202 may be operable to receive access permissions from the first user 118 associated with the POS device 104 or the electronic device 108. The access permissions may be received by the processor 202 from the POS device 104 or the electronic device 108, via the transceiver 210. The transceiver 210 may be operable to receive the access permissions, via the communication network 116. The access permissions may be provided by the first user 118 at the POS device 104 or the electronic device 108. The received access permissions may correspond to a set of permissions to share at least a portion of the created first user account with the plurality of accounts. The plurality of accounts may comprise the first account and/or the one or more other accounts. In accordance with an embodiment, the server 102 may allow the first user 118 to access the second virtual currency instrument associated with the second user 120 based on a set of access rights granted by the second user 120. In accordance with an embodiment, the plurality of virtual currency instruments 106 may correspond to a first virtual currency instrument that may further correspond to a first account of a first merchant. The plurality of virtual currency instruments 106 may correspond to the registered one or more other virtual currency instruments, in addition to the first virtual currency instrument. The registered one or more other virtual currency instruments may further correspond to one or more other accounts of other merchants. The processor 202 may be operable to store the set of user preferences that may tag and/or categorize a service provided by the first account or the one or more other accounts associated with the server 102, in the memory 206.

In accordance with an embodiment, the processor 202 may be operable to receive registration data, associated with the plurality of virtual currency instruments 106, from the electronic device 108 associated with the first user 118. The registration data may be received from the electronic device 108, via the transceiver 210. The registration data may include, but is not limited to, a date of issuance, a date of expiry, a plurality of balance values of the plurality of virtual currency instruments 106, types of the plurality of virtual currency instruments 106, and/or a set of user preferences of the first user 118. The processor 202 may be further operable to store the received registration data in the memory 206.

In accordance with an embodiment, the processor 202 may be operable to register the plurality of virtual currency instruments 106 with the first user 118, based on the registration data of the plurality of virtual currency instruments 106. The processor 202 may be further operable to receive the registration data of the plurality of virtual currency instruments 106 from the first user 118 associated with the POS device 104 or the electronic device 108. In accordance with an embodiment, the processor 202 may be operable to determine a portion of the created first user account and/or the received registration data, which may be transmitted to the POS device 104 or the electronic device 108. The determination of the portion of the created first user account and/or the received registration data may be based on the type of the first account and/or the one or more other accounts, associated with the first user 118. The processor 202 may be further operable to transmit at least a portion of the created first user account and/or the received registration data to the POS device 104, via the transceiver 210, for verification of the first user account. The processor 202 may be operable to receive a notification, via the transceiver 210, based on the successful verification of the transmitted portion of the created first user account and/or the received registration data. In accordance with an embodiment, the processor 202 may further operable to receive a response from a plurality of accounts. The response may comprise a plurality of balance values of the registered plurality of virtual currency instruments 106.

Based on the response, the processor 202 may be operable to generate a redemption log to store the details of the first user account and the plurality of balance values of the registered plurality of virtual currency instruments 106. The processor 202 may further transmit a notification for the first user 118. In accordance with an embodiment, the notification may be displayed at the POS device 104. In accordance with an embodiment, the notification may be displayed at the electronic device 108.

The processor 202 may further update the redemption log. The updated redemption log may correspond to the redemption details of the first virtual currency instrument, transaction details of the first user account, and/or at least a portion of the registration data. The processor 202 may be further operable to update the generated redemption log based on a data log received from the POS device 104 and/or the electronic device 108. The processor 202 may be further operable to confirm the available first balance value of the registered first virtual currency instrument and/or one or more other balance values of the registered one or more other virtual currency instruments. The available first balance value and/or the one or more other balance values may be confirmed to the first user 118 and/or the first account and one or more other accounts. The confirmation may be based on the updated redemption log.

In accordance with an embodiment, the first user 118 may initiate a monetary transaction for a purchase of one or more items that correspond to the first account of the first merchant. The first user 118 may initiate the monetary transaction by use of the registered first virtual currency instrument.

In accordance with an embodiment, the value of the redemption request for a monetary transaction may be higher than the first value associated with the registered first virtual currency instrument by an excess value. In such a case, the processor 202 may receive the redemption request, registration data, and first user account details from the POS device 104 or the electronic device 108. Based on the received redemption request, the processor 202 may be operable to generate a request log that may comprise a timestamp of generated redemption request, a time-to-live of the received redemption request, and/or other such details.

In accordance with an embodiment, the processor 202 may be operable to check the received registration data of the first virtual currency instrument and verify the first user 118 based on the received request. The processor 202 may determine an excess value by which the value of the received redemption request is higher than the first value associated with the registered first virtual currency instrument. Subsequently, the processor 202 may determine the registered one or more other virtual currency instruments associated with the first user 118. The registered one or more other virtual currency instruments may be determined based on the first user account of the first user 118. The processor 202 may further convert the excess value based on an exchange rate between the one or more other values associated with the registered one or more other virtual currency instruments and the first value associated with the registered first virtual currency instrument. The processor 202 may further determine the one or more other balance values of the registered one or more other virtual currency instruments. The one or more other balance values of the registered one or more other virtual currency instruments may be retrieved from the one or more servers associated with one or more accounts.

In accordance with an embodiment, the processor 202 may be operable to determine the registered one or more other virtual currency instruments based on a no-priority scheduling algorithm, such as a round-robin algorithm. Accordingly, the excess value may be split into equal parts for redemption. The excess value may be split into equal parts based on a count of the registered one or more other virtual currency instruments. In such an embodiment, at least portions of the one or more other values associated with the registered one or more other virtual currency instruments may be redeemed based on the splitting of the excess value into the equal parts. In accordance with an embodiment, a selection of the registered one or more other virtual currency instruments may be based on a priority order of the registered one or more other virtual currency instruments. The priority order of the registered one or more other virtual currency instruments may be defined by the first user 118, as a part of the set of user preferences, at the time of the registration of the one or more other virtual currency instruments.

In accordance with an embodiment, the processor 202 may be operable to retrieve a set of user preferences from the memory 206. The set of user preferences may be defined by the first user 118 and may determine a priority order of the registered plurality of virtual currency instruments 106. The processor 202 may be operable to select the registered one or more other virtual currency instruments based on the retrieved set of user preferences.

In accordance with an embodiment, the processor 202 may be operable to determine the priority order of the registered one or more other virtual currency instruments, based on an order of one or more other values associated with the registered one or more other virtual currency instruments. In accordance with an embodiment, the processor 202 may be operable to determine the priority order of the registered one or more other virtual currency instruments, based on category of services associated with the registered one or more other virtual currency instruments. In accordance with an embodiment, the processor 202 may be operable to determine the priority order of the registered one or more other virtual currency instruments, based on exchange rate between the one or more other values associated with the registered one or more other virtual currency instruments and the first value associated with the registered first virtual currency instrument for the excess value. In accordance with an embodiment, the processor 202 may be operable to modify the exchange rate in real time or periodically, based on an analysis of the processed monetary transactions and/or historical monetary transactions retrieved from the first user account of the first user 118.

In accordance with an embodiment, the processor 202, in conjunction with the learning engine 204, the memory 206, and the knowledge base 208, may be operable to determine the priority order of the registered one or more other virtual currency instruments. The processor 202 may be operable to determine the priority order of the registered one or more other virtual currency instruments, based on machine learning of historic user preferences provided by the first user 118. The historic user preferences may comprise the historic set of user preferences, provided by the first user 118.

In accordance with an embodiment, the processor 202 may be operable to determine the priority order of the registered one or more other virtual currency instruments, based on registration data associated with the registered one or more other virtual currency instruments, an order of registration of the one or more other virtual currency instruments, an order of expiration date of the registered one or more other virtual currency instruments, the value of the redemption request, and/or historical redemption requests associated with the first account.

In accordance with an embodiment, the processor 202 may be operable to arrange the registered one or more other virtual currency instruments in a first sequence, based on the determined priority order. The processor 202 may be operable to transmit the first sequence of the registered one or more other virtual currency instruments to the POS device 104 or electronic device 108. The first sequence of registered one or more other virtual currency instruments, as display data, may be rendered at a display screen of the POS device 104 or electronic device 108, via the transceiver 210. In accordance with an embodiment, the display data may further include the priority order for redemption of one or more other values associated with the registered one or more other virtual currency instruments, an option to exchange the registered first virtual currency instrument and the registered one or more other virtual currency instruments, an option to purchase a new virtual currency instrument, the registration data associated with the registered first virtual currency instrument and/or the registered one or more other virtual currency instruments, an exchange rate associated with exchanging the registered first virtual currency instrument and the registered one or more other virtual currency instruments and/or the like.

In accordance with an embodiment, the POS device 104 or electronic device 108 may be operable to receive the set of user preferences from the first user 118. The set of user preferences may correspond to a selection of the registered one or more other virtual currency instruments from the POS device 104 or the electronic device 108 for redemption of the excess value. In other words, the set of user preferences may include a revised priority order for the registered one or more other virtual currency instruments arranged in the first sequence. The set of user preferences may further include preferred values for each of the registered one or more other virtual currency instruments for redemption. The set of user preferences may further include instructions to split the excess value into user-preferred parts for each of the registered one or more other virtual currency instruments for redemption. In accordance with an embodiment, the processor 202 may be operable to receive the second sequence of the registered one or more other virtual currency instruments, via the transceiver 210. In accordance with an embodiment, the second sequence may be exclusively different from the first sequence.

In accordance with an embodiment, the processor 202 may be further operable to authenticate the first sequence or the second sequence (if received) of the registered one or more other virtual currency instruments. The processor 202 may be further operable to authenticate at least portions of the one or more other values associated with the registered one or more other virtual currency instruments. Based on the authentication, the processor 202 may be further operable to process the monetary transaction. The processor 202 may be further operable to redeem the first value and at least portions of the one or more other values. The one or more other values may correspond to the authenticated registered one or more other virtual currency instruments. In accordance with an exemplary scenario, the processor 202 may redeem the first value from the first virtual currency instrument and at least a portion of a second value from a second virtual currency instrument. The second value is selected by the processor 202, based on the highest exchange rate offered by the second account of the second merchant.

In accordance with an embodiment, the processor 202 may be operable to update the first balance value of the registered first virtual currency instrument and the one or more other balance values of the registered one or more other virtual currency instruments when the monetary transaction is processed. The processor 202 may be further operable to update the request log and/or the redemption log stored in the memory 206 based on the processing of the monetary transaction. The processor 202 may be further operable to transmit the updated first balance value of the registered first virtual currency instrument to the POS device 104, via the transceiver 210 for reconciliation.

In accordance with an embodiment, the learning engine 204, in conjunction with the processor 202, may be operable to deduce knowledge and learn data, based on the data related to monetary transactions, retrieved from the memory 206. The data may include the request log, the redemption log, and/or the historic set of user preferences. The learning engine 204 may be operable to utilize the deduced knowledge and the learned data to generate a recommendation of the plurality of virtual currency instruments 106 to the second user 120. The learning engine 204 may be further operable to utilize the deduced knowledge and the learned data to determine a priority order of the registered one or more other virtual currency instruments based on a frequency of usage and success rate of completion of one or more monetary transactions. The priority order may be based on one or more performance characteristics of the first account and/or the one or more other accounts for historic monetary transactions. The learning engine 204 may be further operable to utilize the deduced knowledge and the learned data to determine criteria for conversion of value based on an optimum exchange rate. The learning engine 204 may be further operable to utilize the deduced knowledge and the learned data to predict the set of user preferences to determine the second sequence of the registered one or more other virtual currency instruments, to minimize user intervention. The learning engine 204 may be operable to store the deduced knowledge and the learned data in the knowledge base 208.

Figure 3:
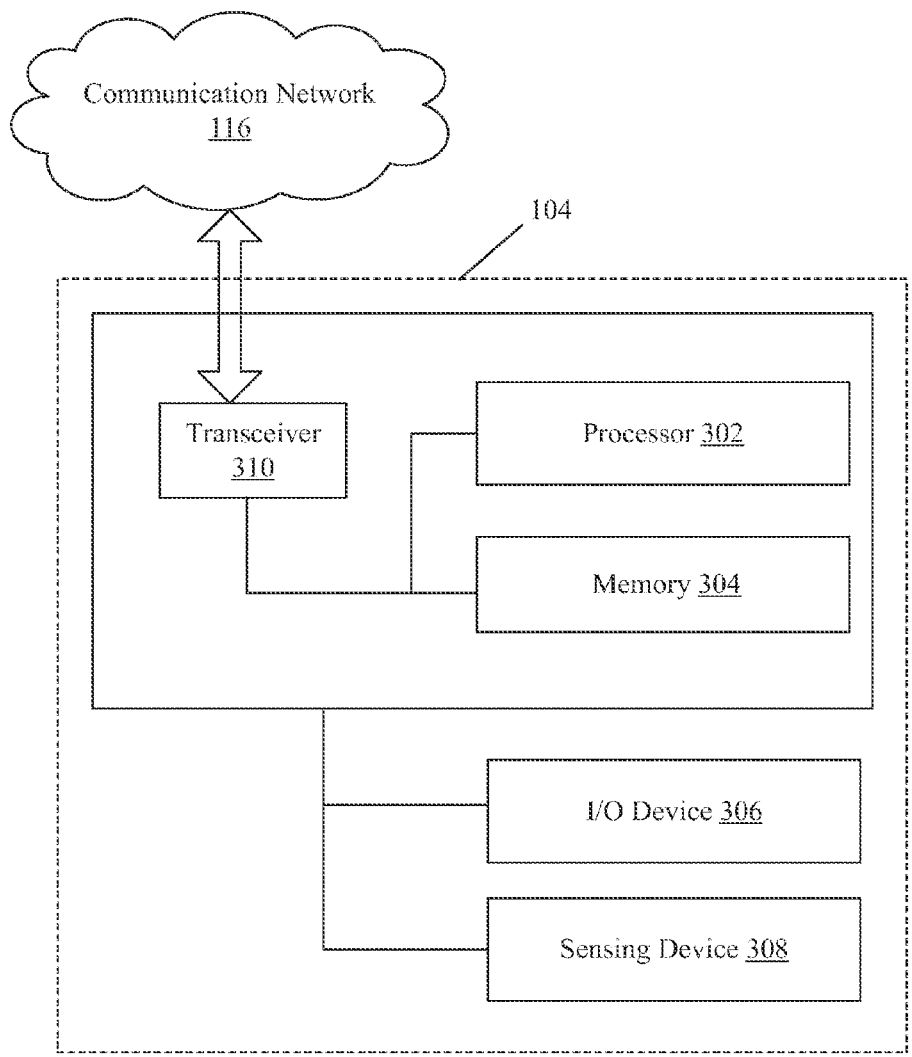
FIG. 3 is a block diagram that illustrates an exemplary point-of-sale (POS) device to process a monetary transaction, in accordance with an embodiment of the disclosure.

FIG. 3 is a block diagram that illustrates an exemplary POS device to process a monetary transaction, in accordance with an embodiment of the disclosure. FIG. 3 is explained in conjunction with elements from FIGS. 1 and 2. With reference to FIG. 3, there is shown the POS device 104. The POS device 104 may comprise one or more circuits, such as a processor 302. The POS device 104 may further comprise a memory 304, an input/output (I/O) device, such as I/O device 306, and a sensing device 308. The POS device 104 may further comprise a transceiver 310. The processor 302 may be communicatively coupled to the memory 304, the I/O device 306, the sensing device 308, and the transceiver 310.

The processor 302 may comprise suitable logic, circuitry, interfaces, and/or code that may be operable to execute a set of instructions stored in the memory 304. The processor 302 may be operable to establish an association of the POS device 104 with an account of a merchant, such as the first account. The processor 302, may be similar to the processor 202, and may be implemented based on a number of processor technologies known in the art, as described in FIG. 2.

The memory 304 may comprise suitable logic, circuitry, and/or interfaces that may be operable to store a machine code and/or a computer program with at least one code section executable by the processor 302. The memory 304 may be operable to store the registration data that corresponds to a user, such as the first user 118 and/or the second user 120. The memory 304 may be further operable to store the information required by a first account associated with the POS device 104, for verification of the first user 118. The memory 304 may be further operable to store the data log generated by the POS device 104. The memory 306 may be operable to store one or more generic software applications, such as a merchant payment system, that may facilitate the processor 302 to process the monetary transaction. Examples of implementation of the memory 304 may be similar to the examples of the implementation of the memory 206, as described in FIG. 2.

The I/O device 306 may comprise suitable logic, circuitry, interfaces, and/or code that may comprise input devices and output devices. The input devices may be operable to receive one or more inputs from a user, such as the first user 118. The output devices may be operable to provide one or more outputs to the first user 118. The I/O device 306 may be operable to receive the registration data of a virtual currency instrument, such as the plurality of virtual currency instruments 106. The I/O device 306 may be operable to communicate the input data to the processor 302 and/or the memory 304. Examples of the input devices may include, but are not limited to, a magnetic card reader, an electronic signature-capture device, a smart card reader, a touch screen, a touch pad, a microphone, and/or a keyboard. Examples of the output devices may include, but are not limited to, a display screen and/or a speaker.

The sensing device 308 may comprise suitable logic, circuitry, and/or interfaces that may be operable to detect biometric information of one or more users, such as the first user 118. Examples of the sensing device 308 may include, but are not limited to, a fingerprint scanner, a palm geometry scanner, an iris scanner, and/or a facial scanner. In accordance with an embodiment, the sensing device 308, such as an electronic signature-capture device and/or a magnetic card reader, may comprise one or more sensors to confirm reception, recognition, identification, and/or verification of the plurality of virtual currency instruments 106. Examples of such one or more sensors may include, but are not limited to, an optic sensor, an image sensor, and/or a magnetic sensor.

The transceiver 310 may comprise suitable logic, circuitry, interfaces, and/or code that may be operable to communicate with the server 102, via the communication network 116. The transceiver 310 may implement known technologies to support wired or wireless communication of the POS device 104 with the communication network 116. The transceiver 310 may include one or more electronic components, as described for the transceiver 210 (FIG. 2). The transceiver 310 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, as described in FIG. 2.

In operation, the processor 302 may be operable to receive a request for verification of the first user account of the first user 118 from the server 102, via the transceiver 310. In accordance with an embodiment, the first user account may be created at the server 102, based on user data, such as a first user identifier, a first user passkey, and/or personal data of the first user 118. The first user account may further comprise access permissions provided by the first user 118. The access permissions may comprise a set of permissions to share at least a portion of the created first user account with a user, such as the second user 120. The first account may further comprise registration data associated with the plurality of virtual currency instruments 106. The plurality of virtual currency instruments 106 may comprise a first virtual currency instrument that may correspond to a first account of a first merchant. In addition to the first virtual currency instrument, the plurality of virtual currency instruments 106 may further comprise the registered one or more other virtual currency instruments that may correspond to other accounts of other merchants. In accordance with an embodiment, the first virtual currency instrument and/or the one or more other virtual currency instruments may be registered at the server 102.

In accordance with an embodiment, the received request may comprise at least a portion of the first user account and/or the registration data for verification of the first user account. The processor 302 may be operable to retrieve the information from the memory 304, to verify the first user account for the first user 118. In accordance with an embodiment, the information required for verification of the first user account may be customized based on the type of the first account and/or the one or more other accounts. The processor 302 may be further operable to transmit a response, via the transceiver 310. In accordance with an embodiment, the transmitted response may be an acceptance response. The acceptance response may correspond to a successful verification of the first user account and the registration data by the first account. The acceptance response may comprise a plurality of balance values of the registered plurality of virtual currency instruments 106.

The registered plurality of virtual currency instruments 106 may comprise a registered first virtual currency instrument and registered one or more other virtual currency instruments. In accordance with an embodiment, the transmitted response may be a denial response. The denial response may correspond to an unsuccessful verification of the first user account and the registration data by the first account. The processor 302, via the I/O device 306, may be operable to communicate the acceptance or denial response to the first user 118. The transmitted acceptance or denial response may be communicated based on one or both of a text-based message and/or a voice-based message.

In accordance with an embodiment, processor 302 may be operable to receive a redemption request from the first user 118 to initiate a monetary transaction for a purchase of one or more items that correspond to the first account of the first merchant. The received redemption request may correspond to redemption of a first value associated with the registered first virtual currency instrument of the plurality of virtual currency instruments 106. Based on the redemption request, a monetary transaction may be initiated. In accordance with an embodiment, the first virtual currency instrument may correspond to a virtual currency instrument, such as a digital mobile wallet app. The received redemption request may be initiated by a tapping operation of the electronic device 108 with the POS device 104. Based on the tapping operation, an NFC-based, contactless connection may be established between the electronic device 108 and the POS device 104. Based on the established connection, the processor 302 may be operable to receive the registration data of the first virtual currency instrument and the first user account of the first user 118.

In accordance with an embodiment, the first virtual currency instrument may correspond to a tangible payment card, such as a bankcard, possessed by the first user 118. The processor 302 may be operable to receive the registration data of the tangible payment instrument based on a swipe operation or scan operation of the tangible payment card with the sensing device 308. The sensing device 308 may be operable to confirm reception, recognition, identification, and/or verification of the tangible payment card. The sensing device 308 may be operable to retrieve the registration data from the tangible payment card based on the swipe operation or the scan operation of the tangible payment card. The sensing device 308 may be further operable to communicate the registration data to the processor 302. In accordance with an embodiment, the sensing device 308 may be operable to store the registration data in the memory 304.

In accordance with an embodiment, the registration data may correspond to the initiated monetary transaction for redemption. In accordance with an embodiment, the processor 302 may be operable to execute the generic software application, such as the merchant payment system, retrieved from the memory 304. In an embodiment, the first user 118 may manually provide a value of the redemption request. In an embodiment, the processor 302 may automatically determine the value of the redemption request when the one or more items, to be purchased, is scanned by an associated I/O device 306, such as a bar code reader. In accordance with an embodiment, the processor 302 may be operable to determine that the value of the redemption request for a monetary transaction is less than the first value associated with the registered first virtual currency instrument. The processor 302 may be operable to redeem the first value associated with the registered first virtual currency instrument. The processor 302 may be further operable to update the first balance value of the registered first virtual currency instrument, based on the difference of the first value and the received value, in the memory 304. The processor 302 may be further operable to transmit a notification to the electronic device 108 (associated with the first user 118), via the transceiver 310. In accordance with an embodiment, the I/O device 306 may be operable to display the notification. The notification may correspond to completion of the initiated monetary transaction.

In accordance with an embodiment, the processor 302 may be operable to transmit the updated first balance value of the registered first virtual currency instrument to the server 102, via the transceiver. The processor 302 may be further operable to update local data log stored in the memory 304, based on one or more monetary transactions. In accordance with an embodiment, the updated data log may be transmitted to the server 102, via the transceiver 310, to update a request log and/or a redemption log generated at the server 102.

In accordance with an embodiment, the processor 302 may be operable to determine that the value of the redemption request for a monetary transaction is higher than the first value associated with the registered first virtual currency instrument. In accordance with an embodiment, the processor 302 may be operable to determine the excess value by which the value of the received redemption request is higher than the first value associated with the registered first virtual currency instrument. In accordance with an embodiment, the processor 302 may be operable to transmit the redemption request to the server 102, via the transceiver 310. The processor 302 may be further operable to transmit a portion of the first user account and the registration data of the first virtual currency instrument, to the server 102, via the transceiver 310.

Based on the transmitted request, the server 102 may verify the first user 118 and the registration data of the first virtual currency instrument. The server 102 may determine a priority order of the registered one or more other virtual currency instruments registered with the first user 118. Based on the determination, the processor 302 may be operable to receive a first sequence of the registered one or more other virtual currency instruments. The processor 302 may be further operable to receive one or more other balance values of the registered one or more other virtual currency instruments. The processor 302 may be further operable to store the one or more balance values of the registered one or more other virtual currency instruments (in the received first sequence) in the memory 304. In accordance with an embodiment, the processor 302 may be operable to transmit the received first sequence of the registered one or more other virtual currency instruments to the electronic device 108.

The processor 302 may be operable to determine a second sequence of the registered one or more other virtual currency instruments. In accordance with an embodiment, the second sequence may be determined based on a set of user preferences, provided by the first user 118. In accordance with an embodiment, the second sequence may be same as that of the first sequence. In accordance with an embodiment, the second sequence may be different from the first sequence. In accordance with an embodiment, the second sequence may be a subset of the first sequence. In an exemplary scenario, the second sequence may comprise only one registered virtual currency instrument, such as the second virtual currency instrument. In accordance with the exemplary embodiment, at least a portion of the second value associated with the second virtual currency instrument may be redeemed based on the determined excess value. In accordance with an embodiment, the processor 302 may be operable to receive a selection of the one or more other registered virtual currency instruments from the electronic device 108 for the redemption of the excess value. The processor 302 may be operable to determine the second sequence of the registered one or more other virtual currency instruments based on the received selection.

In accordance with an embodiment, the processor 302 may be operable to transmit the determined second sequence to the server 102 for authentication of the second sequence. In accordance with an embodiment, the processor 302 may not receive the second sequence from the electronic device 108. In such a case, the processor 302 may transmit a signal to the server 102 to proceed with the first sequence. When the monetary transaction is processed at the server 102, the processor 302 may be operable to receive an updated first balance value of the registered first virtual currency instrument and the one or more other balance values of the registered one or more other virtual currency instruments. The updated balance values may be received via the transceiver 310.

Based on the received updated values of the first virtual currency instrument, the processor 302 may be further operable to reconcile the first balance value associated with the registered first virtual currency instrument. The processor 302 may be further operable to communicate a notification to the first user 118 after the reconciliation of the first balance value. The notification may correspond to a successful completion of the monetary transaction. In accordance with an embodiment, the I/O device 306 may be operable to display the notification when the first virtual currency instrument is a tangible payment card. In accordance with an embodiment, the processor 302 may be operable to transmit the notification to the electronic device 108 when the first virtual currency instrument is a virtual currency instrument.

Figure 4:
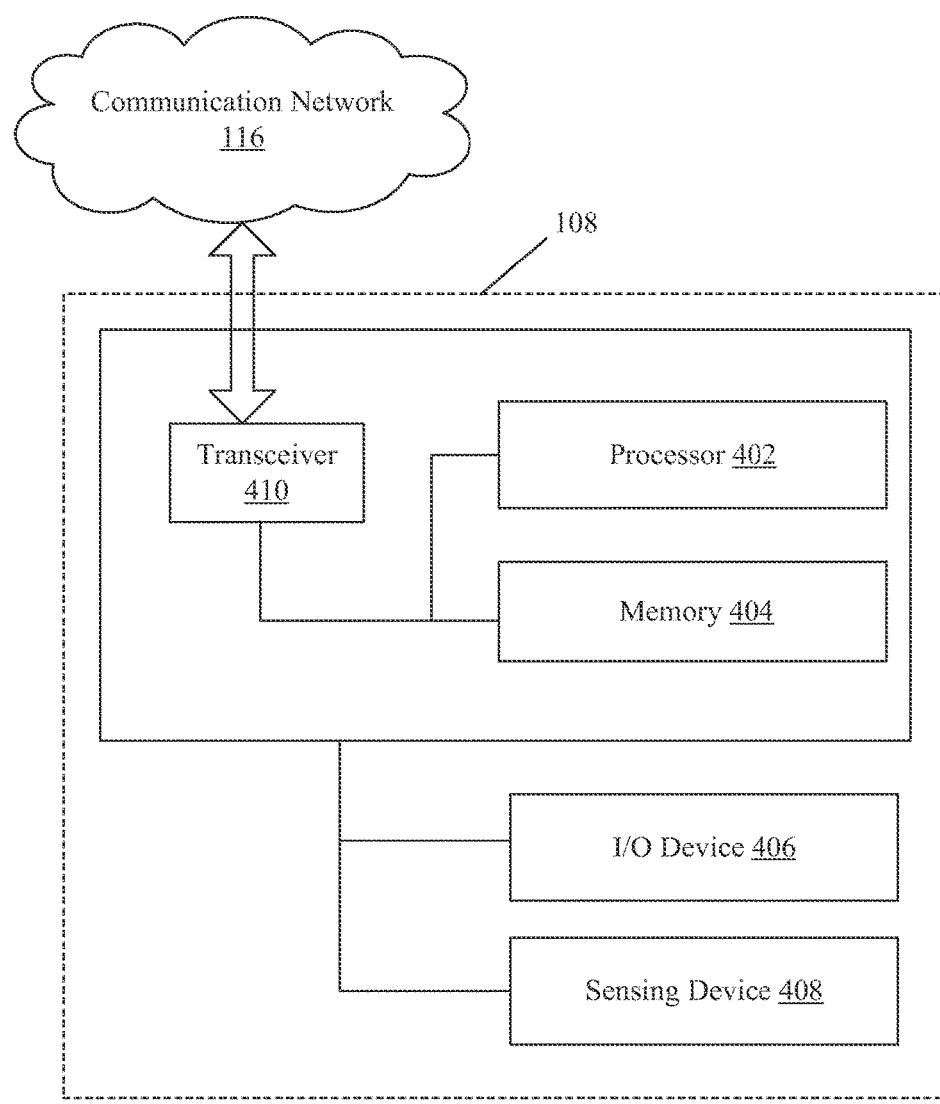
FIG. 4 is a block diagram that illustrates an exemplary electronic device to process a monetary transaction, in accordance with an embodiment of the disclosure.

FIG. 4 is a block diagram that illustrates an exemplary electronic device to process a monetary transaction, in accordance with an embodiment of the disclosure. FIG. 4 is explained in conjunction with elements from FIGS. 1 to 3. With reference to FIG. 4, there is shown the electronic device 108. The electronic device 108 may comprise one or more circuits, such as a processor 402. The electronic device 108 may further comprise a memory 404, an input/output (I/O) device, such as I/O device 406, and a sensing device 408. The electronic device 108 may further comprise a transceiver 410. The processor 402 may be communicatively coupled to the memory 404, the I/O device 406, the sensing device 408, and the transceiver 410.

The processor 402 may comprise suitable logic, circuitry, interfaces, and/or code that may be operable to execute a set of instructions stored in the memory 404. The processor 402 may be operable to provide an interface to the first user 118 to process a monetary transaction. The processor 402, may be similar to the processor 202, and may be implemented based on a number of processor technologies known in the art, as described in FIG. 2.

The memory 404 may comprise suitable logic, circuitry, and/or interfaces that may be operable to store a machine code and/or a computer program with at least one code section executable by the processor 402. The memory 404 may be operable to store a software application that may facilitate the electronic device 108 to be configured as the smart POS device 104a, to process the monetary transaction. The memory 404 may be further operable to store the registration data that corresponds to a user, such as the first user 118 and/or the second user 120. The memory 404 may be further operable to store the information required by a first account associated with the POS device 104, for verification of the first user 118. Examples of implementation of the memory 404 may be similar to the examples of the implementation of the memory 206, as described in FIG. 2.

The I/O device 406 may comprise suitable logic, circuitry, interfaces, and/or code that may comprise input devices and output devices. The input devices may be operable to receive one or more inputs from a user, such as the first user 118. The output devices may provide one or more outputs to the first user 118. The I/O device may be operable to receive the registration data of a virtual currency instrument, such as the plurality of virtual currency instruments 106. The I/O device 406 may be operable to communicate the input data to the processor 402 and/or the memory 404. Examples of implementation of the I/O device 406 may be similar to the examples of the implementation of the I/O device 306, as described in FIG. 3.

The sensing device 408 may comprise suitable logic, circuitry, and/or interfaces that may be operable to detect biometric information of one or more users, such as the first user 118. Examples of implementation of the sensing device 408 may be similar to the examples of the implementation of the sensing device 308, as described in FIG. 3.

The transceiver 410 may comprise suitable logic, circuitry, interfaces, and/or code that may be operable to communicate with the server 102, via the communication network 116. The transceiver 410 may implement known technologies to support wired or wireless communication of the electronic device 108 with the communication network 116. The transceiver 410 may include one or more electronic components, as described for the transceiver 210 (FIG. 2). The transceiver 410 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, as described in FIG. 2.

In operation, the processor 402 may be operable to request for creation of the first user account of the first user 118. The request may be transmitted to the server 102 directly, or via the POS device 104. In accordance with an embodiment, the first user account may be created at the server 102, based on user data, transmitted by the processor 402, via the I/O device 406. The processor 402 may be further operable to receive access permissions provided by the first user 118, via the I/O device 406. The access permissions may comprise a set of permissions to share at least a portion of the created first user account with a user, such as the second user 120 with other accounts. The processor 402 may be further operable to receive registration data associated with the plurality of virtual currency instruments 106. The plurality of virtual currency instruments 106 may correspond to a first virtual currency instrument that may correspond to a first account of a first merchant. In addition to the first virtual currency instrument, the plurality of virtual currency instruments 106 may further correspond to the registered one or more other virtual currency instruments that may correspond to one or more other accounts of one or more other merchants.

In accordance with an embodiment, a verification request may be transmitted by the POS device 104 to the server 102. The verification request may comprise at least a portion of the first user account and/or the registration data of the plurality of virtual currency instruments 106 for verification of the first user account. Based on the verification of the first user account by the server 102, the processor 402 may receive a notification that corresponds to a successful registration of the plurality of virtual currency instruments 106 with the first user 118. In accordance with an embodiment, the processor may further receive a plurality of balance values of the plurality of virtual currency instruments 106 to display the information of the first user 118.

In accordance with an embodiment, processor 402 may be operable to generate a redemption request of the registered first virtual currency instrument for processing a monetary transaction. The redemption request may be generated for a purchase of one or more items that correspond to the first account of the first merchant. In accordance with an embodiment, the redemption request may be generated by a tapping operation of the electronic device 108 with the POS device 104. Based on the tapping operation, an NFC-based, contactless connection may be established between the electronic device 108 and the POS device 104. The received redemption request may correspond to redemption of the first value associated with the registered first virtual currency instrument of the plurality of virtual currency instruments 106. Based on the redemption request, a monetary transaction may be initiated and a connection may be established. Based on the established connection, the processor 402 may be operable to transmit the registration data of the first virtual currency instrument and the first user account of the first user 118 to the POS device 104 or the server 102.

In accordance with an embodiment, the processor 402 may be operable to initiate the monetary transaction by establishing a secure connection between the server 102 and the electronic device 108, based on the secure protocols implemented in the communication network 116. In accordance with an embodiment, the processor 402 may be operable to initiate the monetary transaction based on a user input that may include biometric information and/or a gesture. The sensing device 408 may be operable to verify the received biometric information and/or gesture based on the information pre-stored in the memory 404 that may correspond to the first user 118. Based on the established secure connection, the processor 402 may be operable to transmit the registration data of the first virtual currency instrument to the POS device 104 or the server 102. In accordance with an embodiment, the processor 402 may be operable to execute the software application retrieved from the memory 404. Based on the execution of the software application, the processor 402 may configure the electronic device 108 as the smart POS device 104*a*.

In accordance with an embodiment, the value of the redemption request for a monetary transaction may be less than the first value associated with the registered first virtual currency instrument. The first value associated with the registered first virtual currency instrument may be redeemed based on the value of the redemption request. The processor 402 may be further operable to receive the notification that may comprise an updated first balance value of the registered first virtual currency instrument, via the transceiver 410. The updated first balance value may correspond to the difference of the first value and the value of the redemption request. The processor 402 may be further operable to display or play the received notification for the first user 118, based on the use of I/O device 406. In accordance with an embodiment, the I/O device 406 may be operable to display or play the notification. The notification may correspond to completion of the initiated monetary transaction.

In accordance with an embodiment, the value of the redemption request for a monetary transaction may exceed the first value associated with the registered first virtual currency instrument. In such a case, the server 102 may determine the excess value by which the value of the received redemption request is higher than the first value associated with the registered first virtual currency instrument. The server 102 may determine a priority order of the registered one or more other virtual currency instruments registered with the first user 118. Based on the determination, the processor 402 may be operable to receive a first sequence of the registered one or more other virtual currency instruments of the first user 118 as display data from the server 102 or the POS device 104, via the transceiver 410. The processor 402 may be further operable to receive the one or more other balance values of the registered one or more other virtual currency instruments.

In accordance with an embodiment, the received first sequence may comprise the registered one or more other virtual currency instruments arranged in a sequence based on the priority order. The priority order may be determined based on one or more criteria. Instances of the one or more criteria may include, but are not limited to, an order of one or more other values associated with the registered one or more other virtual currency instruments, category of services associated with the registered one or more other virtual currency instruments, the exchange rate between the one or more other values associated with the registered one or more other virtual currency instruments and the registered first virtual currency instrument, and machine learning of historic user preferences provided by the first user 118.

In accordance with an embodiment, the processor 402 may be operable to receive a set of user preferences to select the registered one or more other virtual currency instruments from the display data. The set of user preferences may be received via the I/O device 406. Based on the set of user preferences, the processor 402 may be operable to modify the first sequence to determine a second sequence of the registered one or more other virtual currency instruments. In accordance with an embodiment, the second sequence may include a revised priority order for the registered one or more other virtual currency instruments. In accordance with an embodiment, the second sequence may be same as that of the first sequence. In accordance with an embodiment, the second sequence may be different from the first sequence.

In accordance with an embodiment, the processor 402 may be operable to transmit the second sequence to the server 102 or the POS device 104, via the transceiver 410. In accordance with an embodiment, at least portions of the one or more other values associated with the registered one or more other virtual currency instruments may be redeemed based on the determined excess value.

In accordance with an embodiment, the processor 402 may be operable to receive a notification that may correspond to the processing of the monetary transaction from the server 102 or the POS device 104. In accordance with an embodiment, the received notification may include updated first balance value of the registered first virtual currency instrument and the one or more other balance values of the registered one or more other virtual currency instruments.

Figure 5:
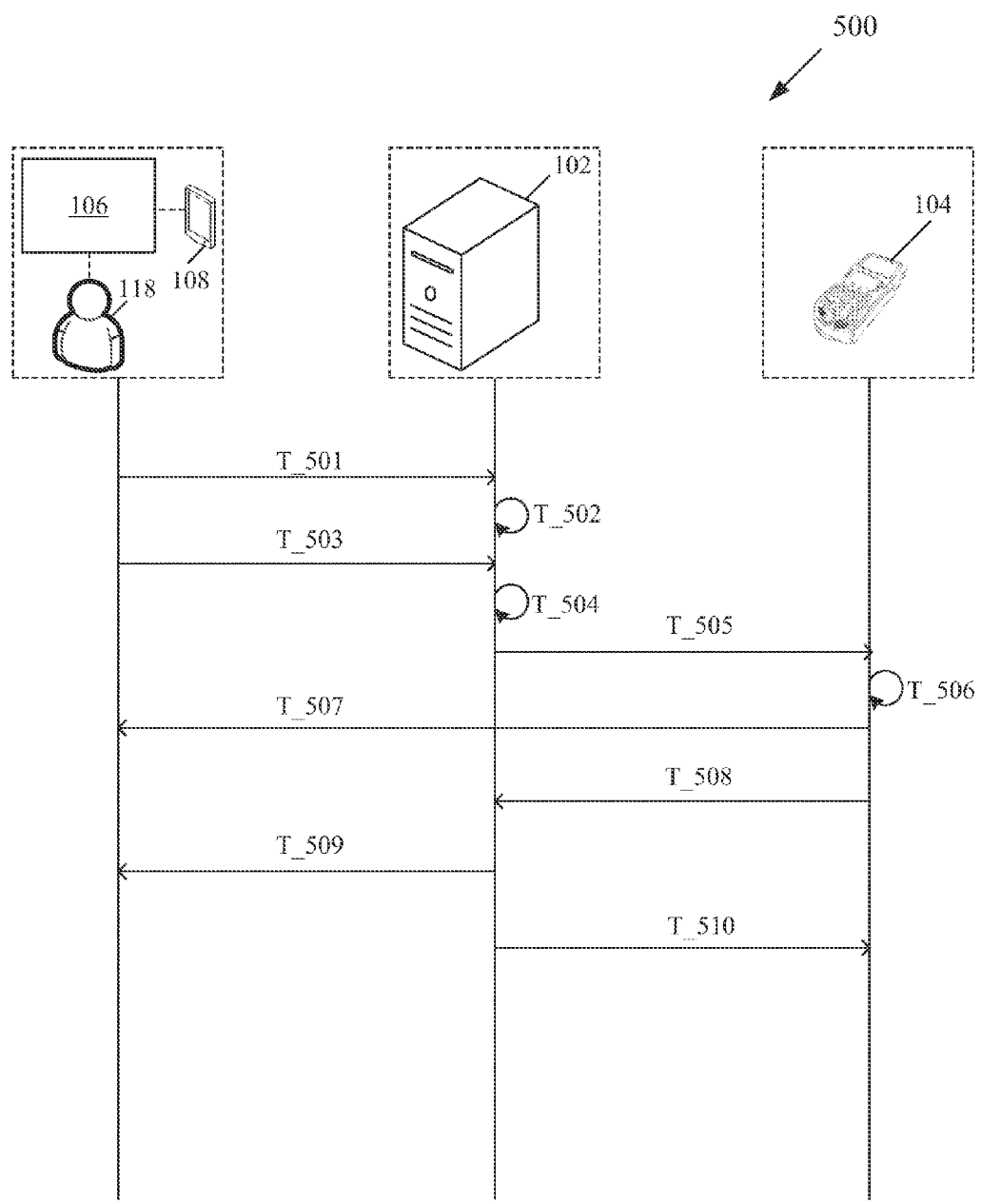
FIG. 5 illustrates a first exemplary timing diagram for registration of one or more other virtual currency instruments with a first user, in accordance with an embodiment of the disclosure.

FIG. 5 illustrates a first exemplary timing diagram for registration of one or more virtual currency instruments with the first user 118, in accordance with an embodiment of the disclosure. FIG. 5 is explained in conjunction with elements from FIGS. 1 to 4. The first exemplary timing diagram 500 may include the server 102, the POS device 104, and the first user 118

With reference to FIG. 5, there is shown a first exemplary timing diagram 400 that illustrates a scenario for creation of a user account and registration of one or more virtual currency instruments at the server 102. The user may correspond to the first user 118. The one or more virtual currency instruments may correspond to the plurality of virtual currency instruments 106. The plurality of virtual currency instruments 106 may comprise the registered first virtual currency instrument and the registered one or more other virtual currency instruments. The first virtual currency instrument may correspond to a first account of a first merchant. The registered one or more other virtual currency instruments may correspond to one or more other accounts of one or more other merchants.

At time "T_501", the first user 118 may provide a request to the server 102 to create the first user account. The request may be provided via the electronic device 108. The request for the creation of the first user account may comprise user data, such as a first user identifier, a first user passkey, and/or personal data of the first user 118. At time "T_502", the server 102 may create the first user account based on the received request from the first user 118.

At time "T_503", the first user 118 may further transmit registration data associated with the plurality of virtual currency instruments 106 to the server 102 for registration. At time "T_504", the server 102 may store the received registration data in the created first user account. At time "T_505", the server 102 may transmit at least a portion of the created first user account and/or the registration data to the POS device 104, for verification of the first user account.

At time "T_506", the POS device 104 may determine a response based on the verification. At time "T_507", the POS device 104 may transmit the response for the first account and/or the one or more other accounts, to the first user 118. The response may comprise a plurality of balance values of the registered plurality of virtual currency instruments 106. At time "T_508", the POS device 104 may transmit the response for the first account and/or the one or more other accounts, to the server 102.

At time "T_509", the server 102 may transmit a confirmation of creation of the first user account and successful registration of the plurality of virtual currency instruments 106, to the electronic device 108. At time "T_510", the server 102 may transmit the confirmation of creation of the first user account and successful registration of the plurality of virtual currency instruments 106, to the POS device 104. The confirmation may also comprise acknowledgement of the plurality of balance values of the registered plurality of virtual currency instruments 106.

Figure 6:
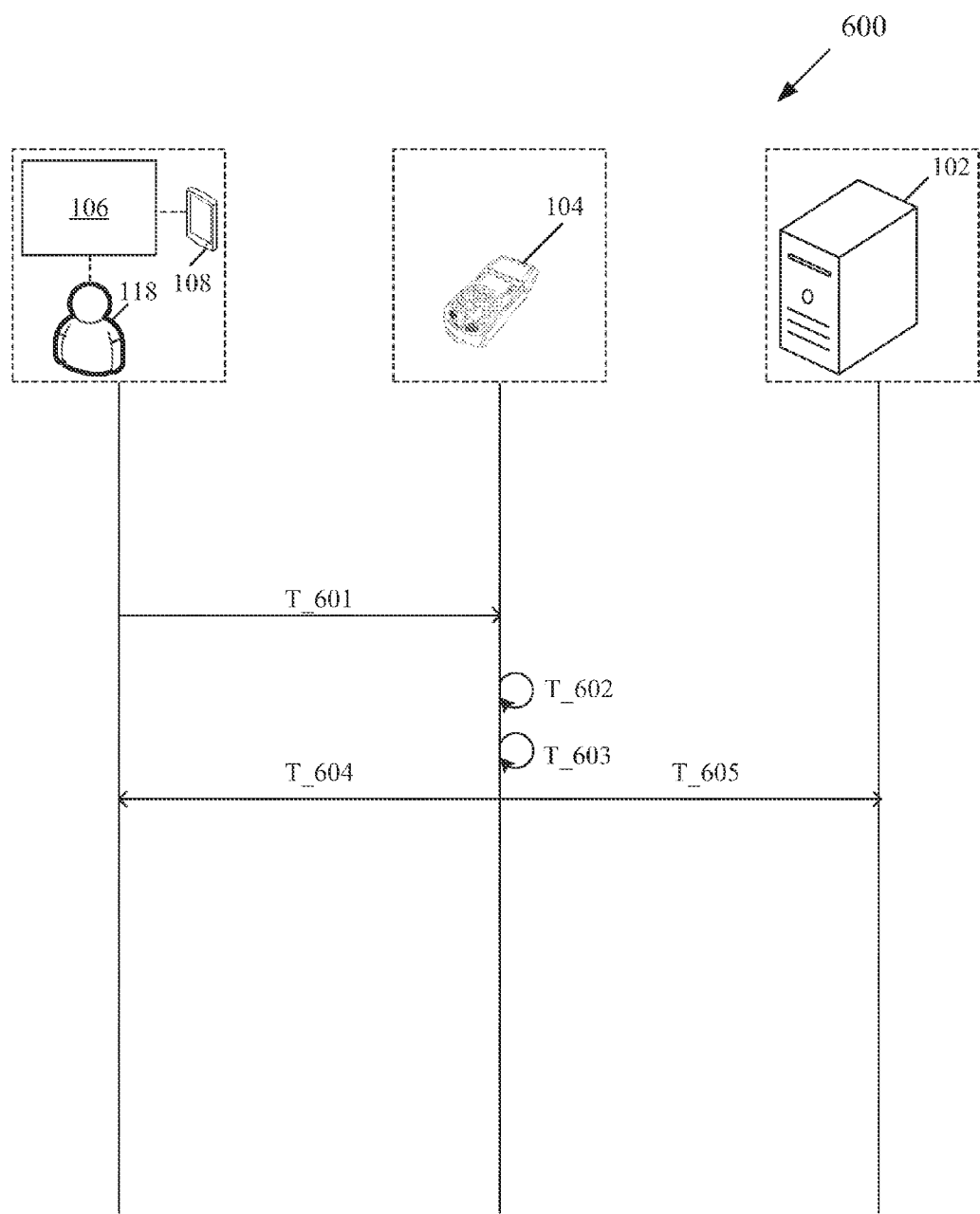
FIG. 6 illustrates a second exemplary timing diagram to implement the disclosed method and system to process a first monetary transaction, in accordance with an embodiment of the disclosure.

FIG. 6 illustrates a second exemplary timing diagram to implement the disclosed method and system to process a first monetary transaction, in accordance with an embodiment of the disclosure. FIG. 6 is explained in conjunction with elements from FIGS. 1 to 5. With reference to FIG. 6, there is shown a second exemplary timing diagram 600. The second exemplary timing diagram 600 may include the server 102, the POS device 104, and the first user 118.

At time "T_601", the first user 118 may generate a redemption request to initiate a monetary transaction for a purchase of one or more items that correspond to the first account of the first merchant. The first user 118 may initiate the monetary transaction by use of the registered first virtual currency instrument, via the POS device 104 or the electronic device 108. The first user 118 associated with the electronic device 108, may transmit at least a portion of the registration data of the registered first virtual currency instrument, such as mobile wallet points, to the POS device 104.

At time "T_602", the POS device 104 may receive the portion of the registration data of the registered first virtual currency instrument. In accordance with an embodiment, the POS device 104 may determine the portion of the registration data of the registered first virtual currency instrument, such as a tangible payment card. At time "T_603", the POS device 104 may determine that the first value associated with the registered first virtual currency instrument is higher than the value of the redemption request by an excess value. The POS device 104 may redeem the first value for the value of the redemption request. Based on the redemption, the first balance value of the registered first virtual currency instrument may be updated with the difference of the first value and the value of the redemption request.

At time "T_604", the POS device 104 may transmit a notification to the first user 118 associated with the electronic device 108. The notification may correspond to a successful completion of the monetary transaction. The notification may further comprise the updated first balance value of the registered first virtual currency instrument. At time "T_605", the POS device 104 may transmit the updated first balance value of the registered first virtual currency instrument to the server 102. The POS device 104 may be further operable to transmit the updated data log that corresponds to the processed monetary transaction, to the server 102 for reconciliation.

Figure 7:
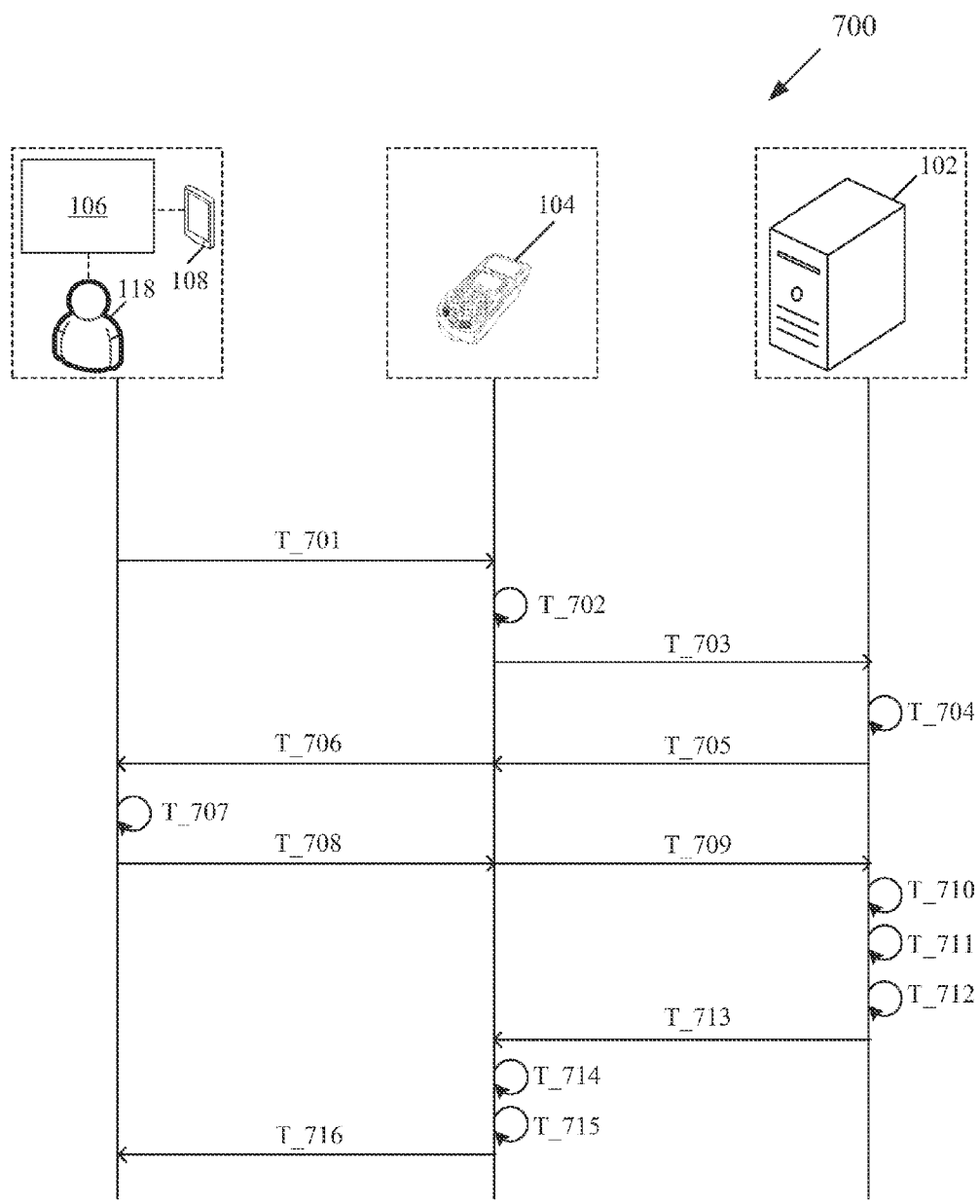
FIG. 7 illustrates a third exemplary timing diagram to implement the disclosed method and system to process a second monetary transaction, in accordance with an embodiment of the disclosure.

FIG. 7 illustrates a third exemplary timing diagram to implement the disclosed method and system to process a second monetary transaction, in accordance with an embodiment of the disclosure. FIG. 7 is explained in conjunction with elements from FIGS. 1 to 5. With reference to FIG. 7, there is shown a third exemplary timing diagram 700. The third exemplary timing diagram 700 may include the server 102, the POS device 104, and the first user 118.

At time "T_701", the first user 118 may generate a redemption request to initiate a monetary transaction for a purchase of one or more items that correspond to the first account of the first merchant. The first user 118 may initiate the monetary transaction by use of the registered first virtual currency instrument, via the POS device 104 or the electronic device 108.

At time "T_702", the POS device 104 may determine a portion of the registration data of the registered first virtual currency instrument. The POS device 104 may be further operable to determine that the first value associated with the registered first virtual currency instrument is less than the value of the redemption request. At time "T_703", the POS device 104 may transmit the redemption request to the server 102. The POS device 104 may further transmit the first user account and the registration data of the first virtual currency instrument, to the server 102. In accordance with an embodiment, the transmitted redemption request may correspond to a request for different options to use the registered one or more other virtual currency instruments of the one or more other accounts, to process the monetary transaction.

At time "T_704", the server 102 may check the registration data of the first virtual currency instrument and verify the first user 118. Based on the verification, the server 102 may be further operable to determine the one or more other virtual currency instruments registered with the first user 118. The registered one or more other virtual currency instruments may be determined based on the first user account of the first user 118. The selection of the registered one or more other virtual currency instruments may be based on a priority order of the registered one or more other virtual currency instruments. The server 102 may arrange the registered one or more other virtual currency instruments in a first sequence based on the determined priority order. At time "T_705", the server 102 may transmit the first sequence of the registered one or more other virtual currency instruments to the POS device 104. At time "T_706", the POS device 104 may transmit the received first sequence of the registered one or more other virtual currency instruments to the electronic device 108 associated with the first user 118.

At time "T_707", the first user 118 may provide a second sequence of the registered one or more other virtual currency instruments, based on the set of user preferences, via the electronic device 108. The set of user preferences may correspond to a selection of the registered one or more other virtual currency instruments from the electronic device 108 for redemption of the excess value. The set of user preferences may further include preferred values for each of the registered one or more other virtual currency instruments for the redemption of the excess value. The set of user preferences may further include instructions to split the excess value into user-preferred parts for each of the registered one or more other virtual currency instruments for the redemption of the excess value. In other words, at least portions of the one or more values associated with the registered one or more other virtual currency instruments may be determined for the redemption. At time "T_708", the second sequence may be transmitted to the POS device 104, At time "T_709", the POS device 104 may transmit the received second sequence to the server 102. At time "T_710", based on the received second sequence, the server 102 may authenticate the received second sequence of the registered one or more other virtual currency instruments. The server 102 may further authenticate at least portions of the one or more values associated with the registered one or more other virtual currency instruments. At time "T_711", based on the authentication, the server 102 may process the monetary transaction based on redemption of the first value and at least portions of the one or more other values. The one or more other values may correspond to the authenticated registered one or more other virtual currency instruments.

At time "T_712", the server 102 may update the first value in the first virtual currency instrument and the one or more other values associated with the registered one or more other virtual currency instruments when the monetary transaction is processed. At time "T_713", the server 102 may transmit the updated first balance value of the registered first virtual currency instrument and the one or more other balance values of the registered one or more other virtual currency instruments to the POS device 104. At time "T_714", the updated first balance value of the registered first virtual currency instrument and the one or more other balance values of the registered one or more other virtual currency instruments may be displayed. At time "T_715", the POS device 104 may utilize the updated first balance value for reconciliation of the first balance value of the registered first virtual currency instrument.

At time "T_716", based on the received updated first balance value and/or the one or more other balance values, the POS device 104 may transmit a notification to the electronic device 108, associated with the first user 118. The notification may correspond to a message that may confirm the updated first balance value of the registered first virtual currency instrument and the one or more other balance values of the registered one or more other virtual currency instruments. The notification may further correspond to a message that may confirm the processed monetary transaction.

It may be understood that depending on the embodiment, the timing sequence of some of the steps as described in FIGS. 5 to 7, may be altered, without deviating from the scope of the disclosure. Further, some of the steps may be eliminated while other additional steps may be added.

Figure 8:
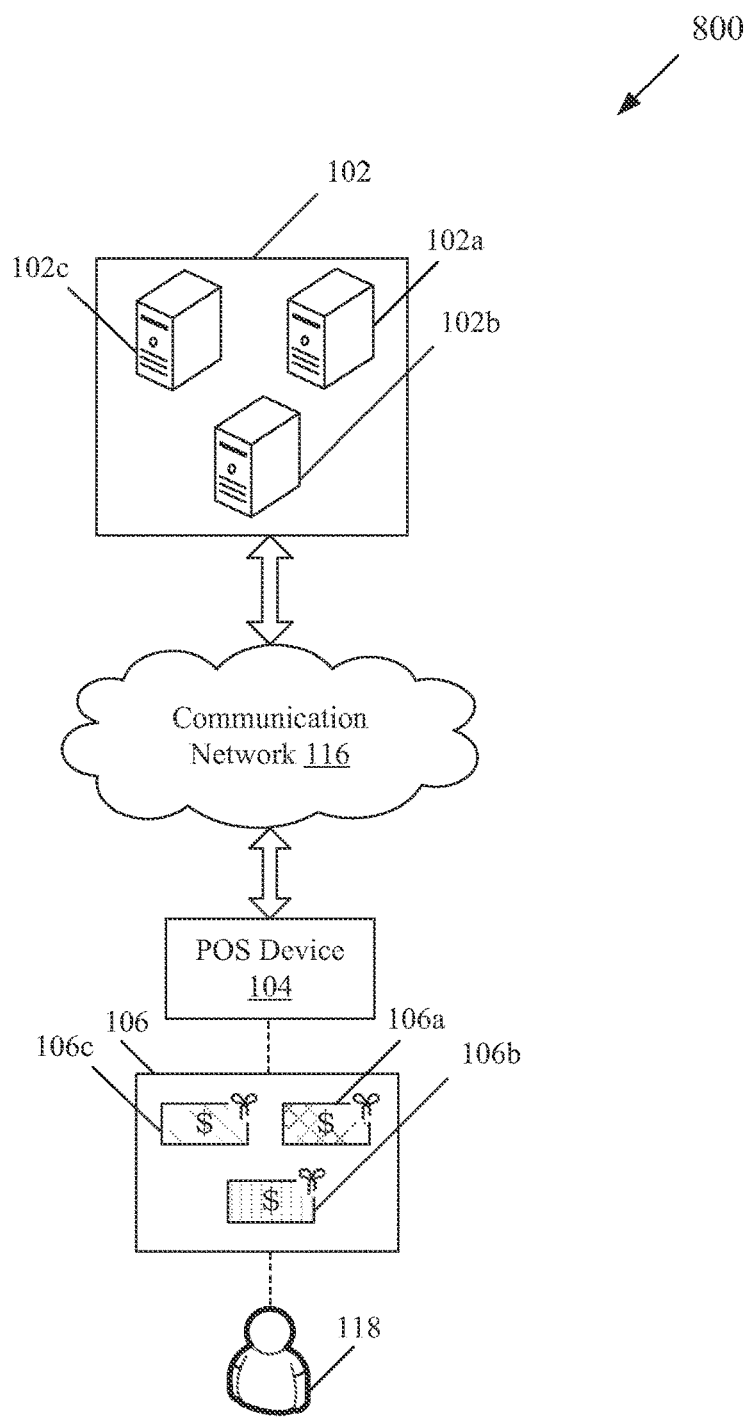
FIG. 8 illustrates an exemplary scenario to implement the disclosed method and system to process a monetary transaction, in accordance with an embodiment of the disclosure.

FIG. 8 illustrates an exemplary scenario to implement the disclosed method and system to process a monetary transaction, in accordance with an embodiment of the disclosure. FIG. 8 is explained in conjunction with elements from FIGS. 1 to 4. With reference to FIG. 8 there is shown an exemplary scenario 800 that comprises an exemplary server, such as the server 102. The server 102 may be associated with one or more other servers. The one or more other servers may be associated with one or more accounts, such as a first account 102a, a second account 102b, and/or a third account 102c, respectively. The first account 102a may correspond to a first merchant. The second account 102b may correspond to a second merchant. The third account 102c may correspond to a third merchant. Each of the first account 102a, the second account 102b, and the third account 102c may correspond to a first virtual currency instrument 106a, a second virtual currency instrument 106b, and a third virtual currency instrument 106c, respectively. Each of the first virtual currency instrument 106a, the second virtual currency instrument 106b, and the third virtual currency instrument 106c may be registered at the server 102 prior to the monetary transaction. The first virtual currency instrument 106a, the second virtual currency instrument 106b, and the third virtual currency instrument 106c may be further associated with a first user account of a first user 118.

In an exemplary scenario, each of the first virtual currency instrument 106a, the second virtual currency instrument 106b, and the third virtual currency instrument 106c, may be associated with a first value, a second value, and a third value, respectively. The first value, the second value, and the third value may be, "$20", each. Consequently, the total amount of value available with the first user account of the first user 118 for redemption for a monetary transaction is, "$60".

In an exemplary scenario, the first user 118 may initiate a monetary transaction to redeem the first value associated with the registered first virtual currency instrument 106a. The transaction may be initiated by providing registration data of the first virtual currency instrument 106a to the POS device 104. The value of the redemption request may be, "$26". In such an exemplary scenario, the POS device 104 may be operable to determine that the value of the redemption request is higher than the first value associated with the registered first virtual currency instrument 106a by an excess value, "$6". The POS device 104 may redeem the first value, "$20", associated with the first virtual currency instrument 106a. As a result, the first value associated with the registered first virtual currency instrument 106a may be redeemed completely. Further, the remainder value, "$6", of the redemption request may be redeemed from other virtual currency instruments registered with the first user account of the first user 118.

In an exemplary scenario, the POS device 104 may transmit the first user account and the registration data of the first virtual currency instrument, to the server 102. Based on the received request, the server 102 may determine the one or more other virtual currency instruments registered with the first user 118, to redeem the remainder value, "$6", of the redemption request. The remainder value, "$6", may be redeemed from the determined registered one or more other virtual currency instruments, such as the second virtual currency instrument 106b and/or the third virtual currency instrument 106c.

In an exemplary scenario, the determination of the registered one or more other virtual currency instruments may be based on a no-priority scheduling algorithm, such as a round-robin algorithm. In such a scenario, the server 102 may select the second virtual currency instrument 106b, and the third virtual currency instrument 106c, for redemption of the remainder value, "$6", of the redemption request. The server 102 may split the remainder value, "$6", in two equal parts of value, "$3", each. The server 102 may then redeem the value, "$3", from the second value and the third value, each. As a result, the value, "$26", of the redemption request may be successfully redeemed by use of the combination of the first virtual currency instrument 106a, the second virtual currency instrument 106b, and the third virtual currency instrument 106c. Consequently, the first balance value of the registered first virtual currency instrument 106a is, "$0". Further, the second balance value of the second virtual currency instrument 106b and the third balance value of the third virtual currency instrument 106c is, "$17", each.

In another exemplary scenario, the determination of the registered one or more other virtual currency instruments may be based on an alternative priority order of the registered one or more other virtual currency instruments. In such an exemplary scenario, in accordance with an embodiment, the priority order of the registered one or more other virtual currency instruments may be pre-defined by the first user 118, based on the set of user preferences, at the time of registration of the one or more other virtual currency instruments. The determination of the priority order of the registered one or more other virtual currency instruments may be based on the registration data associated with the registered one or more other virtual currency instruments. For example, the priority order of a virtual currency instrument, whose expiry date is before the expiry date of the other virtual currency instrument, may be higher. In accordance with an embodiment, the learning engine 204 in the server 102 may intelligently determine the priority order of the registered one or more other virtual currency instruments.

Based on the determined priority order, the server 102 may determine a first sequence of the registered one or more other virtual currency instruments in descending priority order associated with each of the registered one or more other virtual currency instruments. The server 102 may transmit the determined first sequence of the registered one or more other virtual currency instruments, as display data, to the first user 118. In an exemplary scenario, the first user 118 associated with the POS device 104 or the electronic device 108, may modify the first sequence to the second sequence, based on the set of user preferences. The set of user preferences may comprise one or more instructions to split the remainder value, "$6", among the registered one or more other virtual currency instruments in the second sequence. In another exemplary scenario, the first user 118 may select one virtual currency instrument, such as the second virtual currency instrument 106b, from the registered one or more other virtual currency instruments in the first sequence. Based on the user selection, the server 102 may redeem at least a portion of the second value, "$20", for the remainder value, "$6", of the redemption request. Consequently, the first balance value is, "$0", and the second balance value is, "$14". Further, the third balance value may remain, "$20".

In another exemplary scenario, the third value may not be a currency value. Instead, the third value may comprise virtual points, such as "20000 virtual points". In an instance, the "20000 virtual points", may correspond to a currency value, "$20". The correspondence of the currency value and the virtual points may be based on an exchange rate. In an embodiment, the exchange rate may be common for the first account 102a, the second account 102b, and the third account 102c. In another embodiment, the exchange rate may be different for the first account 102a, the second account 102b, and the third account 102c.

In another exemplary scenario, the value of the redemption request may be "$46". In such a scenario, the server 102 may redeem the first value, "$20", associated with the first virtual currency instrument 106a and the second value, "$20", associated with the second virtual currency instrument 106b. The remainder value, "$6", of the redemption request may be redeemed from the third virtual currency instrument 106c, based on a conversion of the remainder value, "$6", to virtual points based on the exchange rate. From the conversion, the remainder value, "$6", may correspond to, "6000 virtual points". Consequently, the server 102 may redeem the "6000 virtual points" from the third virtual currency instrument 106c. Based on the processed monetary transaction, the first balance value and the second balance value is, "$0", each. Further, the third balance value is, "14000 virtual points".

Figure 9A:
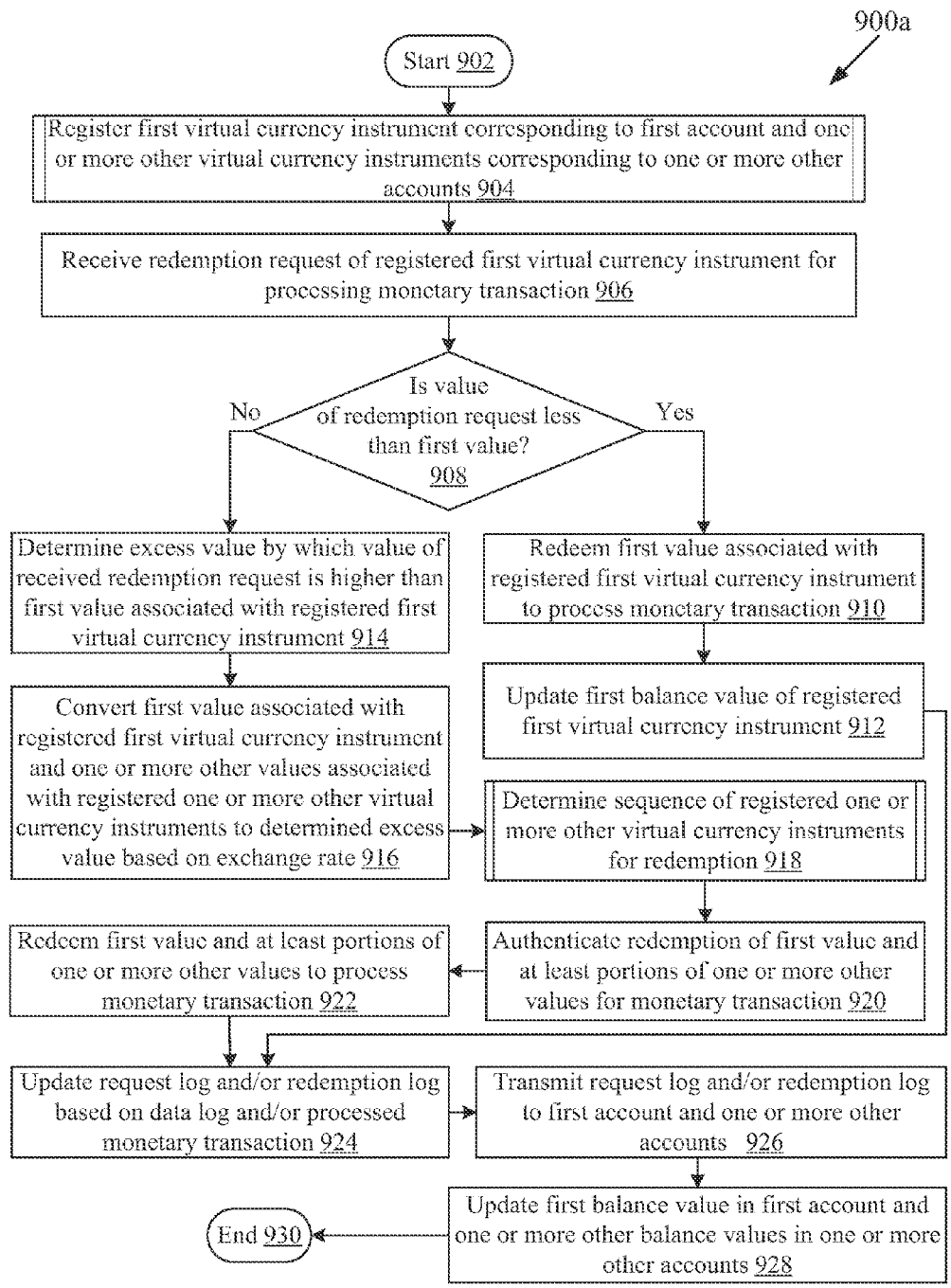
FIG. 9A comprises a first flowchart that illustrates a first method to process a monetary transaction at a server, in accordance with an embodiment of the disclosure.

FIG. 9A comprises a first flowchart that illustrates a first method to process a monetary transaction at the server 102, in accordance with an embodiment of the disclosure. With reference to FIG. 9A there is shown a flowchart 900a. The flowchart 900a is described in conjunction with FIG. 1 to FIG. 4. The method starts at step 902 and proceeds to step 904.

At step 904, a first virtual currency instrument that corresponds to a first account, and one or more other virtual currency instruments that correspond to one or more other accounts, may be registered. The registered first virtual currency instrument and/or the registered one or more other virtual currency instruments may correspond to the first user 118. The registered first virtual currency instrument may be associated with a first value. Similarly, each of the registered one or more other virtual currency instruments may be associated with a corresponding value. The method of registration of the first virtual currency instrument and/or one or more other virtual currency instruments with the first user 118, in accordance with step 904, is further described in FIG. 9B.

At step 906, a redemption request of the registered first virtual currency instrument may be received to process the monetary transaction. The redemption request may correspond to a monetary transaction initiated by the first user 118. At step 908, it may be determined whether value of the received redemption request is higher than the first value associated with the registered first virtual currency instrument. In instances when the value of the received redemption request is less than the first value associated with the registered first virtual currency instrument, the control passes to step 910. In instances when the value of the received redemption request is higher than the first value associated with the registered first virtual currency instrument, the control passes to step 914.

At step 910, when the value of received redemption request is less than the first value associated with the registered first virtual currency instrument, the first value associated with the registered first virtual currency instrument may be redeemed for the received redemption request. At step 912, the first balance value of the registered first virtual currency instrument may be updated. Control passes to step 924.

At step 914, when the value of the received redemption request is higher than the first value associated with the registered first virtual currency instrument, an excess value by which the value of the received redemption request is higher than the first value associated with the registered first virtual currency instrument, may be determined.

At step 916, the first value associated with the registered first virtual currency instrument and at least portions of one or more other values associated with the registered one or more other virtual currency instruments may be converted for the determined excess value based on an exchange rate.

At step 918, a sequence of the registered one or more other virtual currency instruments, may be determined for redemption. The method of determination of the sequence of the registered one or more other virtual currency instruments, in accordance with step 918, is further described in FIG. 9C.

At step 920, the redemption of the first value and at least portions of one or more other values associated with the registered one or more other virtual currency instruments may be authenticated. At step 922, the first value associated with the registered first virtual currency instrument and at least portions of the one or more other values associated with the registered one or more other virtual currency instruments may be redeemed.

At step 924, the request log and/or the redemption log may be updated based on the processed monetary transaction. At step 926, the updated request log and/or the redemption log may be transmitted to a plurality of servers associated with the plurality of accounts that include the first account and one or more other accounts. At step 928, the first balance value of the registered first virtual currency instrument and/or one or more other balance values of the registered one or more other virtual currency instruments may be updated in the first account and/or one or more other accounts. The control passes to end step 930.

Figure 9B:
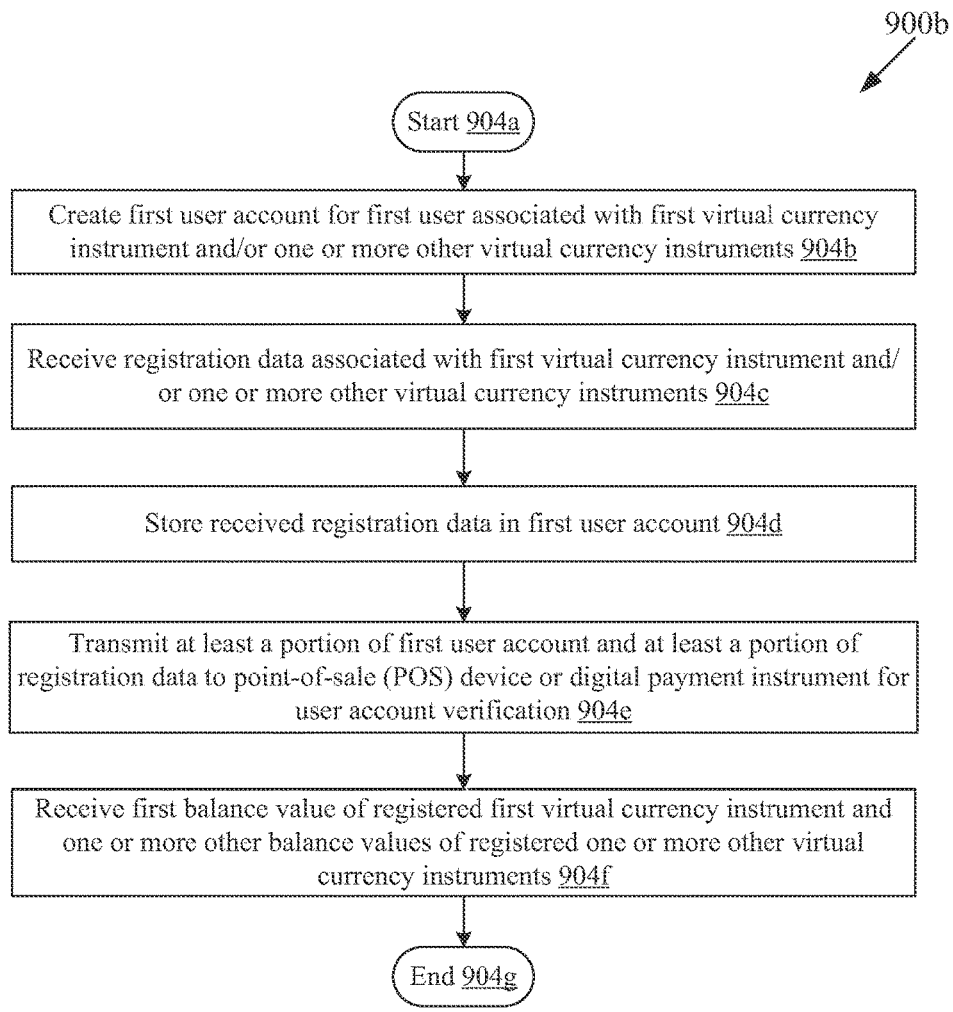
FIG. 9B comprises a second flowchart that illustrates a second method for registration of one or more other virtual currency instruments with a first user at a server, in accordance with an embodiment of the disclosure.

FIG. 9B comprises a second flowchart that illustrates a second method for registration of one or more other virtual currency instruments with the first user 118 at the server 102, in accordance with an embodiment of the disclosure. With reference to FIG. 9B there is shown a flowchart 900*b* for step 904 (FIG. 9A). The flowchart 900*b* for step 904 is described in conjunction with FIGS. 1 to 4 and FIG. 9A. The method starts at step 904*a* and proceeds to step 904*b*.

At step 904*b*, a first user account for the first user 118 associated with the first virtual currency instrument and/or the one or more other virtual currency instruments, may be created. At step 904*c*, registration data associated with the first virtual currency instrument and/or the one or more other virtual currency instruments may be received.

At step 904*d*, the received registration data may be stored in the first user account of the first user 118. At step 904*e*, at least a portion of the first user account and at least a portion of the registration data may be transmitted to the POS device 104 or the electronic device 108 for user account verification. At step 904*f*, the first balance value of the registered first virtual currency instrument and the one or more other balance values of the registered one or more other virtual currency instruments may be received. The control passes to end step 904*g*. The flowchart 900*a* (FIG. 9A) resumes at the step 906 (FIG. 9A).

Figure 9C:
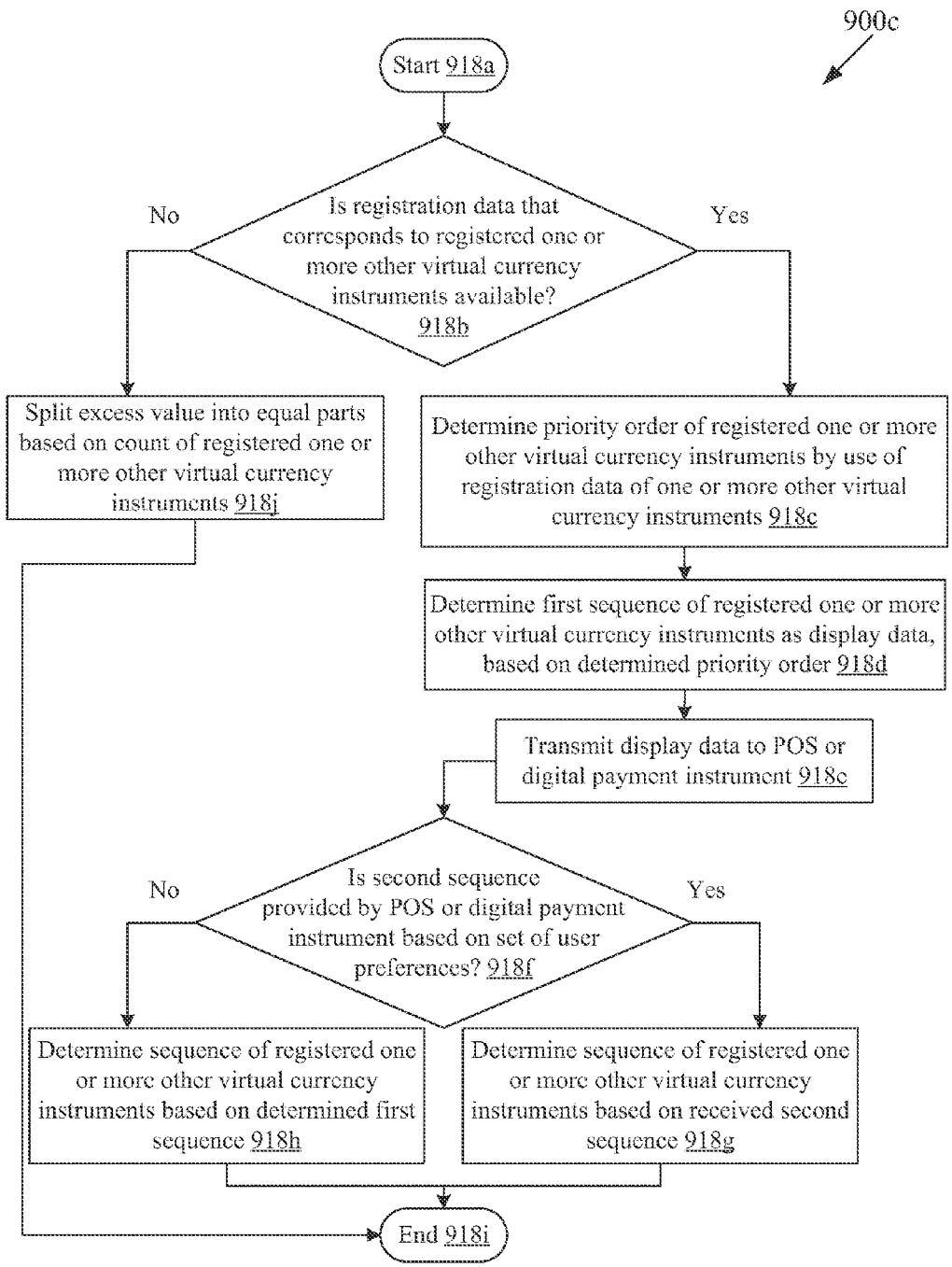
FIG. 9C comprises a third flowchart that illustrates a third method to determine a priority order of registered one or more other virtual currency instruments, in accordance with an embodiment of the disclosure.

FIG. 9C comprises a third flowchart that illustrates a third method to determine a priority order of the registered one or more other virtual currency instruments, in accordance with an embodiment of the disclosure. With reference to FIG. 9C there is shown a flowchart 900*c* for step 918 (FIG. 9A). The flowchart 900*c* is described in conjunction with FIGS. 1 to 4 and FIG. 9A. The method starts at step 918*a* and proceeds to step 918*b*.

At step 918*b*, it may be determined whether registration data that corresponds to the registered one or more other virtual currency instruments is available. In instances when the registration data is available, the control passes to step 918*c*. In instances when the registration data is not available, the control passes to step 918*j*.

At step 918*c*, a priority order of the registered one or more other virtual currency instruments may be determined by use of the registration data of the registered one or more other virtual currency instruments. The determination of the priority order of the registered one or more other virtual currency instruments may be based on one or more criteria. In accordance with an embodiment, the determined priority order may be based on one or more of a category of product or service associated with the monetary transaction. In accordance with an embodiment, the determined priority order may be further based on an exchange rate, an expiration date, and/or historical redemption requests associated with the first account.

At step 918*d*, a first sequence of the registered one or more other virtual currency instruments as display data, may be determined. The determination of the first sequence may be based on the determined priority order. At step 918*e*, the determined display data may be transmitted to the POS device 104 or the electronic device 108.

At step 918*f*, it may be determined whether a second sequence of the registered one or more other virtual currency instruments is provided at the POS device 104 or the electronic device 108 by the first user 118. The first user 118 may provide a set of user preferences based on which the second sequence may be determined. In instances when the second sequence is provided at the POS device 104 or the electronic device 108, the control passes to step 918*g*. In instances when the second sequence is not provided at the POS device 104 or the electronic device 108, the control passes to step 918*h*.

At step 918*g*, a sequence of the registered one or more other virtual currency instruments for the redemption may be determined based on the received second sequence. The control passes to end step 918*i*. At step 918*h*, a sequence of the registered one or more other virtual currency instruments for the redemption may be determined based on the determined first sequence. The control passes to end step 918*i*.

At step 918*j*, when the required registration data is not available, the determined excess value may be split into equal parts based on a count of the registered one or more other virtual currency instruments for the redemption. Accordingly, at least portions of the one or more other values associated with the registered one or more other virtual currency instruments may be redeemed based on the splitting of the excess value into the equal parts. The control passes to the end step 918*i*. The flowchart 900*a* (FIG. 9A) resumes at step 920 (FIG. 9A).

Figure 10:
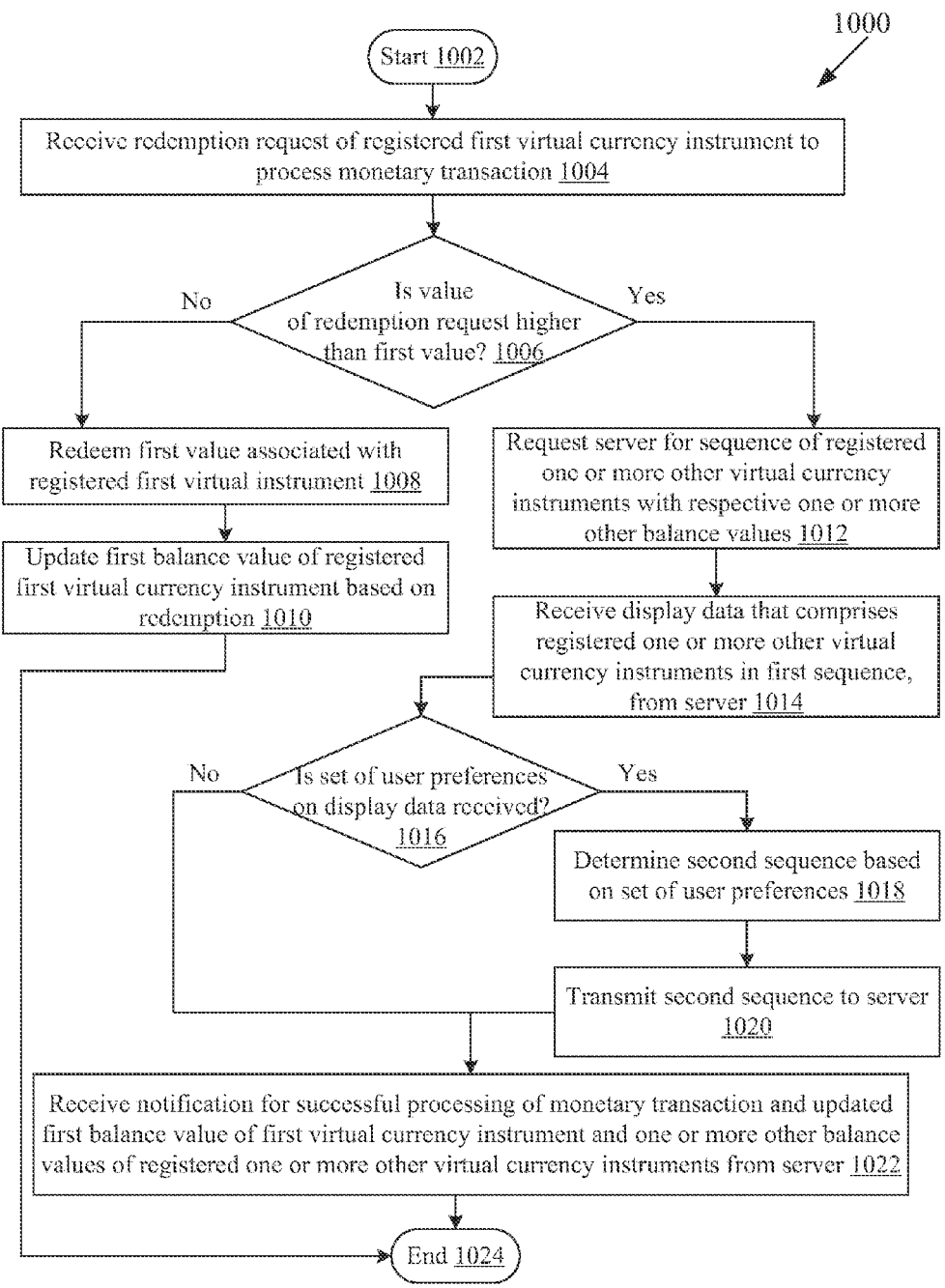
FIG. 10 comprises a fourth flowchart that illustrates a fourth method to process a monetary transaction at a POS device, in accordance with an embodiment of the disclosure.

FIG. 10 comprises a fourth flowchart that illustrates a fourth method to process the monetary transaction at the POS device 104, in accordance with an embodiment of the disclosure. With reference to FIG. 10 there is shown a flowchart 1000. The flowchart 1000 is described in conjunction with FIGS. 1 to 4. The method starts at step 1002 and proceeds to step 1004.

At step 1004, a redemption request of the registered first virtual currency instrument may be received to process the monetary transaction. In accordance with an embodiment, the redemption request may be received directly from the first user 118. In accordance with an embodiment, the redemption request may be received from the first user 118, via the electronic device 108. At step 1006, it may be determined whether the value of the redemption request is higher than the first value associated with the registered first virtual currency instrument. In instances when the value of the redemption request is less than the first value associated with the registered first virtual currency instrument, the control passes to the step 1008. In instances when the value of the redemption request is higher than the first value associated with the registered first virtual currency instrument, the control passes to the step 1012.

At step 1008, when the value of the redemption request is less than the first value associated with the registered first virtual currency instrument, the first value associated with the registered first virtual currency may be redeemed. At step 1010, the first balance value of the registered first virtual currency instrument may be updated based on the redemption. The control passes to the end step 1024.

At step 1012, when the value of the redemption request is higher than the first value associated with the registered first virtual currency instrument, a request may be transmitted to the server 102. The request may be transmitted to the server 102 for a sequence of the registered one or more other virtual currency instruments with respective one or more other balance values. At step 1014, a display data that comprises the registered one or more other virtual currency instruments in a first sequence, may be received directly from the server 102. In accordance with an embodiment, the received display data may be rendered at the POS device 104. In accordance with an embodiment, the received display data may be transmitted to the electronic device 108.

At step 1016, it may be determined whether a set of user preferences on the display data is received from the first user 118. In accordance with an embodiment, the set of preferences may be received from the first user 118 associated with the electronic device 108. In instances when the set of user preferences is received, the control passes to the step 1018. In instances when the set of user preferences is not received, the control passes to the step 1022.

At step 1018, when the set of user preferences is received, a second sequence of the registered one or more other virtual currency instruments may be determined based on the received set of user preferences. At step 1020, the determined second sequence may be transmitted to the server 102.

At step 1022, a notification for successful processing of the monetary transaction, updated first balance value of the registered first virtual currency instrument and one or more other balance values of the registered one or more other virtual currency instruments may be received from the server 102. The control passes to end step 1024.

Figure 11:
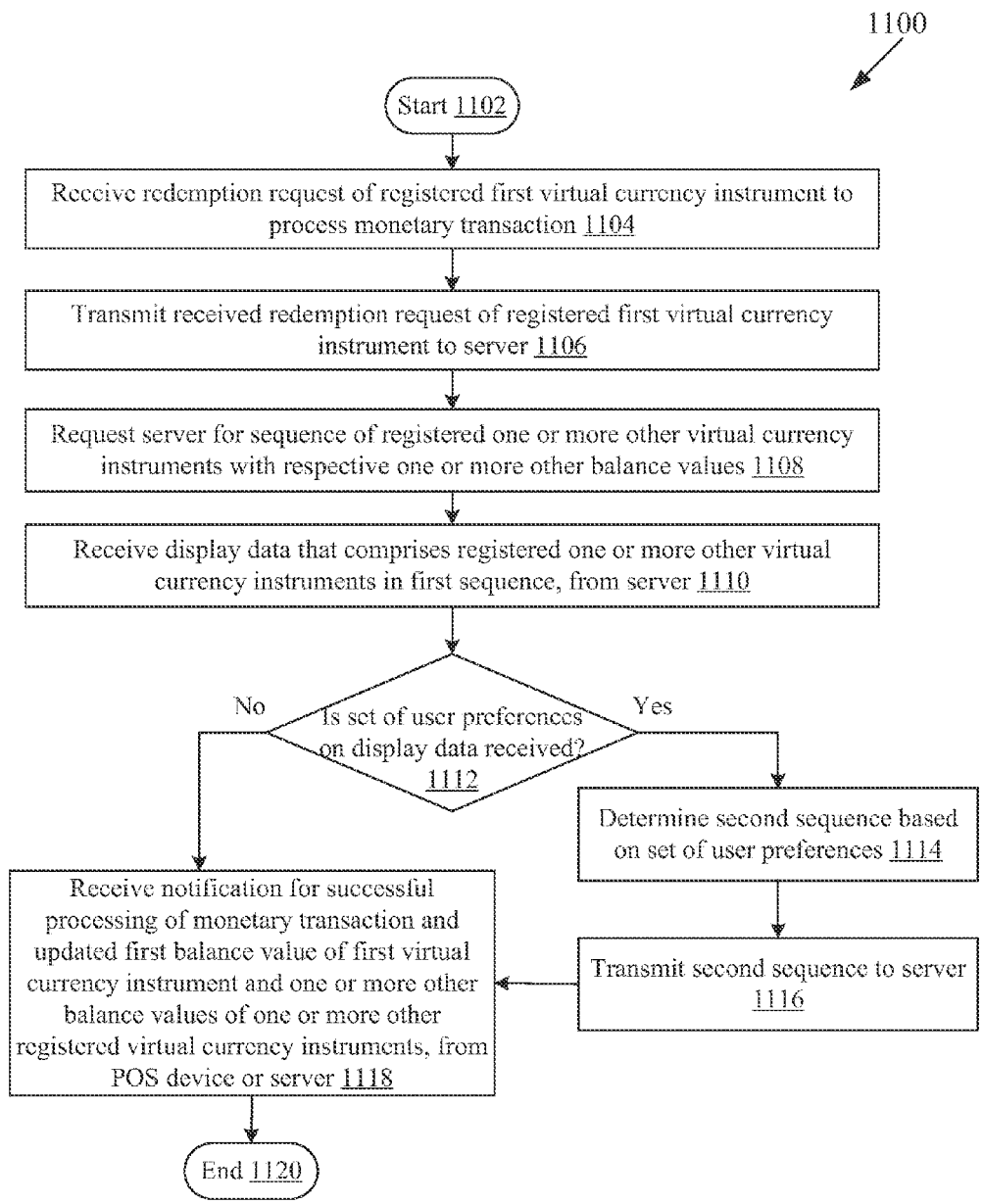
FIG. 11 comprises a fifth flowchart that illustrates a fifth method to process a monetary transaction at an electronic device, in accordance with an embodiment of the disclosure.

FIG. 11 comprises a fifth flowchart that illustrates a fifth method to process the monetary transaction at the electronic device 108, in accordance with an embodiment of the disclosure. With reference to FIG. 11, there is shown a flowchart 1100. The flowchart 1100 is described in conjunction with FIGS. 1 to 4. The method starts at step 1102 and proceeds to step 1104.

At step 1104, a redemption request of the registered first virtual currency instrument may be received to process the monetary transaction. At step 1106, the received redemption request may be transmitted directly to the server 102. In accordance with an embodiment, the received redemption request may be transmitted to the server 102, via the POS device 104.

At step 1108, a request for a sequence of the registered one or more other virtual currency instruments with the respective one or more other balance values, may be transmitted to the server 102. At step 1110, display data that comprises the registered one or more other virtual currency instruments in a first sequence may be received.

At step 1112, it may be determined whether a set of user preferences on the display data is received from the first user 118. In instances when the set of user preferences is received, the control passes to step 1114. In instances when the set of user preferences is not received, the control passes to step 1118.

At step 1114, a second sequence, based on the received set of user preferences, may be determined. At step 1116, the determined second sequence may be transmitted to the server 102. At step 1118, a notification for successful processing of the monetary transaction, updated first balance value of the registered first virtual currency instrument and one or more other balance values of the registered one or more other virtual currency instruments, may be received from the POS device 104 or server 102. The control passes to end step 1120.

In accordance with an embodiment of the disclosure, the system to process a monetary transaction may comprise one or more circuits, such as the processor 202 (FIG. 2), in the server 102. The processor 202 may be operable to register, at the server 102, a first virtual currency instrument that corresponds to a first account and one or more other virtual currency instruments that correspond to one or more other accounts. The registered first virtual currency instrument may be associated with a first value. The processor 202 may further be operable to receive a redemption request of the registered first virtual currency instrument to process the monetary transaction. The value of the received redemption request may be higher than the first value associated with the registered first virtual currency instrument by an excess value. The processor 202 may be further operable to redeem the first value associated with the registered first virtual currency instrument and at least portions of one or more other values associated with the registered one or more other virtual currency instruments, to process the monetary transaction.

In accordance with another aspect of the present disclosure, the system to process a monetary transaction may comprise one or more circuits, such as the processor 302 (FIG. 3), in the POS device 104. The processor 302 may be operable to receive a redemption request of the registered first virtual currency instrument to process a monetary transaction at the POS device 104. The processor 302 may be operable to determine an excess value by which the received redemption request is higher than a first value associated with the registered first virtual currency instrument. The processor 302 may be further operable to receive display data from the server 102. The received display data may comprise the priority order for redemption of one or more other values associated with the registered one or more other virtual currency instruments, an option to exchange the registered first virtual currency instrument and the registered one or more other virtual currency instruments, an option to purchase a new virtual currency instrument, the registration data associated with the registered first virtual currency instrument and/or the registered one or more other virtual currency instruments, and/or an exchange rate associated with exchanging the registered first virtual currency instrument and the registered one or more other virtual currency instruments. The processor 302 may be further operable to select the registered one or more other virtual currency instruments from the electronic device 108 for redemption of the excess value. The processor 302 may be further operable to transmit the selected registered one or more other virtual currency instruments to the server 102. The server 102 may process the monetary transaction based on redemption of the first value and at least portions of one or more other values associated with the received selection of the registered one or more other virtual currency instruments.

In accordance with another aspect of the present disclosure, an electronic device to process a monetary transaction may comprise one or more circuits, such as the processor 402 (FIG. 4), in the electronic device 108. In accordance with an embodiment, the electronic device 108 may be implemented as a smartphone communicatively coupled to a smart card device. The processor 402 may be operable to communicate a redemption request for processing the monetary transaction. The redemption request may be higher than a first value associated with registered first virtual currency instrument by an excess value. The processor 402 may be operable to receive display data from the server 102 or the POS device 104. The processor 402 may be further operable to select the registered one or more virtual currency instruments from the received display data based on a set of user preferences. The processor 402 may be further operable to transmit the selected registered one or more other virtual currency instruments to the server 102 or the POS device 104. The server 102 may process the monetary transaction based on redemption of the first value associated with the registered first virtual currency instrument and at least portions of one or more other values associated with the selected registered one or more other virtual currency instruments. The processor 402 may be further operable to receive updated first balance value associated with the registered first virtual currency instrument and one or more other balance values of the registered one or more other virtual currency instruments and a notification that corresponds to processed monetary transaction.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process a monetary transaction. The at least one code section, in a server, may cause the machine and/or computer to perform the steps that comprise registration, at the server 102, of a first virtual currency instrument that corresponds to a first account and one or more other virtual currency instruments that correspond to one or more other accounts. The registered first virtual currency instrument may be associated with a first value. The server may further receive a redemption request of the registered first virtual currency instrument to process the monetary transaction. The value of the received redemption request may be higher than the first value associated with the registered first virtual currency instrument by an excess value. The server 102 may further redeem the first value associated with the registered first virtual currency instrument and at least portions of one or more other values associated with the registered one or more other virtual currency instruments, to process the monetary transaction. The at least portions of the one or more other values associated with the registered one or more other virtual currency instruments may correspond to the excess value.

In accordance with another aspect of the present disclosure, various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process a monetary transaction. The at least one code section, in a POS device, may cause the machine and/or computer to perform the steps that comprise receiving, at the POS device 104, a redemption request of a registered first virtual currency instrument to process a monetary transaction. An excess value by which the value of the received redemption request is higher than a first value associated with the registered first virtual currency instrument may be determined. Display data may be received from the server 102. The received display data may comprise the priority order for redemption of one or more other values associated with the registered one or more other virtual currency instruments, an option to exchange the registered first virtual currency instrument and the registered one or more other virtual currency instruments, an option to purchase a new virtual currency instrument, the registration data associated with the registered first virtual currency instrument and/or the registered one or more other virtual currency instruments, and/or an exchange rate associated with exchanging the registered first virtual currency instrument and the registered one or more other virtual currency instruments. In accordance with an embodiment, the received display data may be transmitted to the electronic device 108. A selection of the registered one or more other virtual currency instruments may be received from the first user 118, directly or via the electronic device 108, for redemption of the excess value. The received selection of the registered one or more other virtual currency instruments may be transmitted to the server 102. The server 102 may process the monetary transaction based on redemption of the first value and at least portions of one or more other values associated with the received selection of the registered one or more other virtual currency instruments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
registering, at a server, a first virtual currency instrument corresponding to a first account and at least one second virtual currency instrument corresponding to at least one second account, wherein said registered first virtual currency instrument is associated with a first value;
receiving, at said server, a redemption request of said first virtual currency instrument to process a first monetary transaction;
determining, at said server, an excess value corresponding to a second value associated with said received redemption request based on said first value associated with said first virtual currency instrument,
wherein said second value associated with said redemption request is higher than said first value associated with said first virtual currency instrument by said excess value;
determining, at said server, first information that indicates a first sequence of a priority order associated with said registered at least one second virtual currency instrument,
wherein said first information is determined based on a frequency of usage information associated with said at least one second virtual currency instrument and success rate of completion of at least one second monetary transaction associated with said at least one second virtual currency instrument;
determining, at said server by machine learning, learning data over a period of time based on data associated with previous monetary transactions, wherein said data comprises at least one of a request log, a redemption log associated with said first account and said at least one second account, or a history of user preferences;
determining, at said server, second information based on said learning data and said first information, wherein said second information indicates a second sequence of said priority order; and
retrieving, at said server, said first value and at least portions of at least one value associated with said at least one second virtual currency instrument, based on said determined second information, to process said first monetary transaction,
wherein said at least portions of said at least one value corresponds to said excess value.

2. The method according to claim 1, further comprising:
splitting said excess value into equal parts based on a count of a plurality of second virtual currency instruments, wherein said plurality of second virtual currency instruments comprises said at least one second virtual currency instrument; and
retrieving, at said server, said at least portions of at least one value based on said equal parts.

3. The method according to claim 1, wherein said first information of said at least one second virtual currency instrument for said redemption request is further based on at least one of a category of product or a service associated with said first monetary transaction.

4. The method according to claim 1, wherein said first information of said at least one second virtual currency instrument for said redemption request is further based on an exchange rate between said at least one value and said first value.

5. The method according to claim 1, wherein said first information of said at least one second virtual currency instrument for said redemption request is further based on at least one of registration data associated with said at least one second virtual currency instrument, an order of registration of said at least one second virtual currency instrument, an order of expiration date of said at least one second virtual currency instrument, said value of said redemption request, or historical redemption requests associated with said first account.

6. The method according to claim 1, further comprising:
receiving, at said server, registration data associated with said first virtual currency instrument and said at least one second virtual currency instrument.

7. The method according to claim 6, further comprising:
transmitting, by said server, at least a portion of said registration data to a point-of-sale (POS) device for user account verification.

8. The method according to claim 6, wherein said registration data comprises at least one of a date of issuance, a date of expiry, a plurality of balance values that include a first balance value of said first virtual currency instrument and at least a second balance value of said at least one second virtual currency instrument, a first type of said first virtual currency instrument, or a second type of said at least one second virtual currency instrument.

9. The method according to claim 1, further comprising:
generating, at said server, at least one of said request log or said redemption log,
wherein said request log corresponds to said redemption request, and
wherein said redemption log comprises at least one of redemption details of said first virtual currency instrument and said at least one second virtual currency instrument, transaction details of said first account, or at least a portion of registration data.

10. The method according to claim 9, further comprising:
transmitting, by said server, said at least one of said request log or said redemption log to at least a second server associated with said at least one second account.

11. The method according to claim 9, further comprising:
receiving, by said server, data log from at least one of a point-of-sale (POS) device associated with said server or an electronic device associated with one of said POS device or said server; and
updating, at said server, said at least one of said request log or said redemption log based on said data log.

12. The method according to claim 11, wherein said data log comprises at least one of a time stamp associated with said redemption request and said first monetary transaction, tokenized data corresponding to said first account and said at least one second account, tokenized data corresponding to at least one of said POS device or said electronic device, or metadata associated with said first monetary transaction.

13. The method according to claim 11, further comprising transmitting said updated at least one of said request log or said redemption log to said at least one of said POS device or said electronic device based on said first monetary transaction.

14. The method according to claim 1, further comprising:
updating, at said server, a first balance value associated with said first virtual currency instrument and at least a second balance value of said at least one second virtual currency instrument.

15. The method according to claim 1, further comprising:
authenticating, at said server, said first value and said at least portions of said at least one value.

16. The method according to claim 1, wherein said first virtual currency instrument and said at least one second virtual currency instrument comprise at least one of gift cards, visa cards, cash-point cards, prepaid cards, mobile wallet apps, airline miles, coupons, retailer loyalty points, credit card points, bitcoins, or virtual points.

17. A system, comprising:
one or more circuits in a server, wherein said one or more circuits are configured to:
register a first virtual currency instrument corresponding to a first account and at least one second virtual currency instrument corresponding to at least one second account, wherein said first virtual currency instrument is associated with a first value;
receive a redemption request of said first virtual currency instrument to process a first monetary transaction;
determine, at said server, an excess value corresponding to a value associated with said redemption request based on said first value associated with said first virtual currency instrument,
wherein said value associated with said received redemption request is higher than said first value associated with said first virtual currency instrument by said excess value;
determine first information that indicates a first sequence of a priority order associated with said at least one second virtual currency instrument, wherein said first information is determined based on a frequency of usage information associated with said at least one second virtual currency instrument and success rate of completion of at least one second monetary transaction of said at least one second virtual currency instrument;

determine, at said server by machine learning, learning data over a period of time based on data associated with previous monetary transactions, wherein said data comprises at least one of a request log, a redemption log associated with said first account and said at least one second account, or a history of user preferences;

determine second information based on said learning data and said first information, wherein said second information indicates a second sequence of said priority order; and retrieve said first value and at least portions of at least one value associated with said at least one second virtual currency instrument, based on said determined second information, to process said first monetary transaction, wherein said at least portions of said at least one value corresponds to said excess value.

18. The system according to claim 17, wherein said one or more circuits are further configured to:

split said excess value into equal parts based on a count of a plurality of second virtual currency instruments, wherein said plurality of second virtual currency instruments comprises said at least one second virtual currency instrument; and retrieve, at said server, said at least portions of said at least one value based on said equal parts.

19. A non-transitory computer-readable medium having stored thereon, computer-readable instructions, which when executed by a computer, cause said computer to execute operations, said operations comprising:

registering, at a server, a first virtual currency instrument corresponding to a first account and at least one second virtual currency instrument corresponding to at least one second account, wherein said first virtual currency instrument is associated with a first value;

receiving, at said server, a redemption request of said first virtual currency instrument to process a first monetary transaction;

determining, at said server, an excess value corresponding to a second value associated with said received redemption request based on said first value associated with said first virtual currency instrument, wherein said value associated with said redemption request is higher than said first value associated with said first virtual currency instrument by said excess value;

determining, at said server, first information that indicates a first sequence of a priority order associated with said at least one second virtual currency instrument, wherein said first information is determined based on a frequency of usage information associated with said at least one second virtual currency instrument and success rate of completion of at least one second monetary transaction associated with said at least one second virtual currency instrument;

determining, at said server by machine learning, learning data over a period of time based on data associated with previous monetary transactions, wherein said data comprises at least one of a request log, a redemption log associated with said first account and said at least one second account, or a history of user preferences;

determining, at said server, second information based on said learning data and said first information, wherein said second information indicates a second sequence of said priority order; and retrieving, at said server, said first value and at least portions of at least one value associated with said at least one second virtual currency instrument, based on said determined second information, to process said first monetary transaction, wherein said at least portions of said at least one value corresponds to said excess value.

* * * * *